US012450642B2

(12) United States Patent
Duan

(10) Patent No.: US 12,450,642 B2
(45) Date of Patent: Oct. 21, 2025

(54) METHOD AND APPARATUS FOR UPDATING RECOMMENDATION MODEL, COMPUTER DEVICE AND STORAGE MEDIUM

(71) Applicant: TENCENT TECHNOLOGY (SHENZHEN) COMPANY LIMITED, Shenzhen (CN)

(72) Inventor: Pei Duan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 279 days.

(21) Appl. No.: 17/948,977

(22) Filed: Sep. 20, 2022

(65) Prior Publication Data

US 2023/0069999 A1 Mar. 9, 2023

Related U.S. Application Data

(63) Continuation of application No. PCT/CN2021/123009, filed on Oct. 11, 2021.

(30) Foreign Application Priority Data

Nov. 4, 2020 (CN) ........................ 202011219021.4

(51) Int. Cl.
*G06Q 30/0601* (2023.01)
*H04L 67/50* (2022.01)

(52) U.S. Cl.
CPC ....... *G06Q 30/0631* (2013.01); *H04L 67/535* (2022.05)

(58) Field of Classification Search
CPC ......... G06Q 30/06–0645; G06Q 30/08; G06Q 50/01; G16Y 10/00–90
See application file for complete search history.

(56) References Cited

U.S. PATENT DOCUMENTS 10,839,255 B2 * 11/2020 Atasu .................. G06F 18/2321
2016/0012088 A1 * 1/2016 Rossi ..................... G06Q 30/02 707/736
2021/0281918 A1 9/2021 Su et al.

FOREIGN PATENT DOCUMENTS

CN 109635186 A 4/2019
CN 110149541 A 8/2019
(Continued)

OTHER PUBLICATIONS

Guo et al., "Streaming Session-based Recommendation," Proceedings of the 25th ACM SIGKDD international conference on knowledge discovery & data mining, Aug. 4-8, 2019, Anchorage, AK, USA. 9pp. (Year: 2019).*
(Continued)

*Primary Examiner* — Adam L Levine
(74) *Attorney, Agent, or Firm* — Anova Law Group, PLLC

(57) ABSTRACT

A method for updating a recommendation model based on artificial intelligence includes: acquiring sample user data and sample recommendation object data, the sample recommendation object data including data related to sample media objects; generating model updating sample characteristics according to the sample user data and the sample recommendation object data, the model updating sample characteristics including sub-characteristics of at least two characteristic dimensions; inputting the model updating sample characteristics into the recommendation model to update the recommendation model, the recommendation model updated performing recommendation on media objects, and performing local sparsification on model parameters meeting a model sparsification condition in response to determining that the corresponding model parameters of the sub-characteristics in the model updating (Continued)

sample characteristics meet the model sparsification condition in the process of updating the recommendation model.

19 Claims, 10 Drawing Sheets

(56) References Cited

FOREIGN PATENT DOCUMENTS

| | | | | |
|---|---|---|---|---|
| CN | 110321422 A | * | 10/2019 | ....... G06F 17/30702 |
| CN | 110825966 A | * | 2/2020 | ............. G06N 20/00 |
| CN | 112070226 A | * | 12/2020 | ........... G06F 18/214 |
| CN | 110008399 B | * | 4/2023 | ......... G06F 16/9535 |
| CN | 117196744 A | * | 12/2023 | |
| WO | WO-2020207196 A1 | * | 10/2020 | ........... G06F 16/955 |

OTHER PUBLICATIONS

The World Intellectual Property Organization (WIPO) International Search Report for PCT/CN2021/123009 Jan. 17, 2022 7 Pages (including translation).

* cited by examiner

METHOD AND APPARATUS FOR UPDATING RECOMMENDATION MODEL, COMPUTER DEVICE AND STORAGE MEDIUM

RELATED APPLICATION(S)

This application is a continuation application of PCT Patent Application No. PCT/CN2021/123009 filed on Oct. 11, 2021, which claims priority to Chinese Patent Application No. 2020112190214, entitled "METHOD AND APPARATUS FOR UPDATING RECOMMENDATION MODEL, COMPUTER DEVICE AND STORAGE MEDIUM" filed with the China National Intellectual Property Administration on Nov. 4, 2020, all of which are incorporated herein by reference in entirety.

FIELD OF THE TECHNOLOGY

The present disclosure relates to the technical field of computers, and particularly relates to a method and apparatus for updating a recommendation model, a computing device and a storage medium.

BACKGROUND

With the rapid development of Internet technology, Internet products are increasingly popular. People may browse articles, view videos, purchase goods and the like through various Internet products, and consequently, tens and even hundreds of billions data are generated. Enterprises may learn a large amount of data through a recommendation model and recommend related information to users.

A large amount of newly generated data is usually input into the recommendation model, and the recommendation model is updated. However, such a method for updating the recommendation model may introduce the problem of large consumption of the internal memory space of the recommendation model in the updating process.

SUMMARY

Each embodiment of the present disclosure provides a method and apparatus for updating a recommendation model, a computing device and a storage medium.

In one aspect, the present disclosure provides a method for updating a recommendation model, performed by a computing device, the method includes: acquiring sample user data and sample recommendation object data, the sample recommendation object data including data related to sample media objects; generating model updating sample characteristics according to the sample user data and the sample recommendation object data, the model updating sample characteristics including sub-characteristics of at least two characteristic dimensions; and inputting the model updating sample characteristics into the recommendation model to update the recommendation model, the recommendation model updated performing recommendation on media objects, and performing local sparsification on model parameters meeting a model sparsification condition in response to determining that the corresponding model parameters of the sub-characteristics in the model updating sample characteristics meet the model sparsification condition in the process of updating the recommendation model in real time.

In another aspect, the present disclosure provides an apparatus for updating a recommendation model, the apparatus includes: a memory storing computer program instructions; and a processor coupled to the memory and configured to execute the computer program instructions and perform: acquiring sample user data and sample recommendation object data, the sample recommendation object data including data related to sample media objects; generating model updating sample characteristics according to the sample user data and the sample recommendation object data, the model updating sample characteristics comprising sub-characteristics of at least two characteristic dimensions; and inputting the model updating sample characteristics into the recommendation model to update the recommendation model, the recommendation model updated performing recommendation on media objects, and performing local sparsification on model parameters meeting a model sparsification condition in response to determining that the corresponding model parameters of the sub-characteristics in the model updating sample characteristics meet the model sparsification condition in the process of updating the recommendation model.

In yet another aspect, the present disclosure provides a non-transitory computer-readable storage medium storing computer program instructions executable by at least one processor to perform: acquiring sample user data and sample recommendation object data, the sample recommendation object data including data related to sample media objects; generating model updating sample characteristics according to the sample user data and the sample recommendation object data, the model updating sample characteristics comprising sub-characteristics of at least two characteristic dimensions; and inputting the model updating sample characteristics into the recommendation model to update the recommendation model, the recommendation model updated performing recommendation on media objects, and performing local sparsification on model parameters meeting a model sparsification condition in response to determining that the corresponding model parameters of the sub-characteristics in the model updating sample characteristics meet the model sparsification condition in the process of updating the recommendation model.

A computing device includes a memory and one or more processors, the memory storing computer-readable instructions, the computer-readable instructions, when executed by the one or more processors, causing the one or more processors to perform the steps of the method for updating a recommendation model.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The solution provided by an embodiment of the present disclosure relates to technologies such as artificial intelligence, and machine learning (ML). Through the artificial intelligence and the machine learning, a recommendation model and an online streaming learning system including the recommendation model may be constructed. By processing model updating sample characteristics based on the artificial intelligence and the machine learning, media objects can be recommended in real time, the recommendation model can be sparsely processed, and thus the consumption of the internal memory space of the recommendation model can be reduced.

Figure 1:
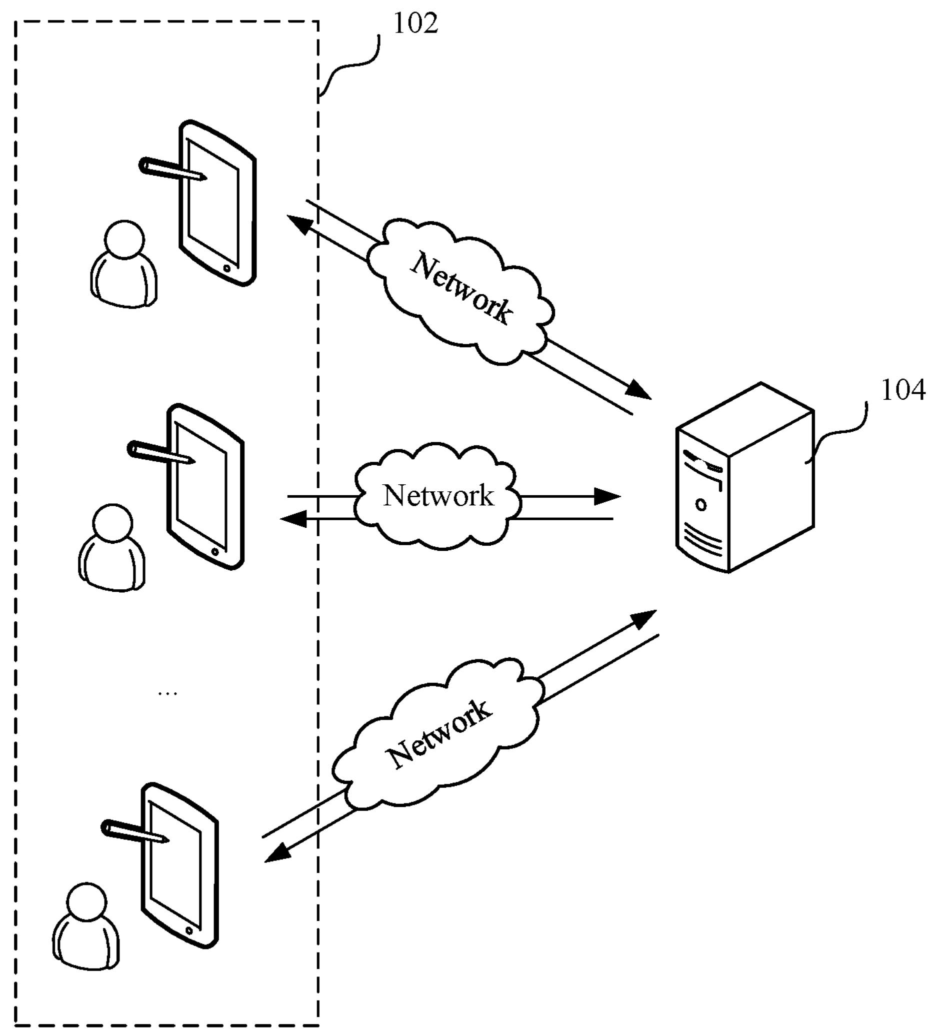
FIG. 1 is a schematic diagram of an implementation environment of a method for updating a recommendation model according to certain embodiment(s) of the present disclosure.

A method for updating a recommendation model provided by the present disclosure can be applied to an implementation environment as shown in FIG. 1. A terminal 102 communicates with a server 104 through a network. The server 104 acquires sample user data and sample recommendation object data from the terminal 102 in real time; generates model updating sample characteristics according to the sample user data and the sample recommendation object data, the model updating sample characteristics including sub-characteristics of at least two characteristic dimensions; and inputs the model updating sample characteristics into the recommendation model to update the recommendation model in real time, the recommendation model updated in real time performing recommendation on media objects in real time, and performing local sparsification on model parameters meeting a model sparsification condition when or in response to determining that the corresponding model parameters of the sub-characteristics in the model updating sample characteristics meet the model sparsification condition in the process of updating the recommendation model in real time. The terminal 102 may be, but not limited to, a personal computer, a notebook computer, a smartphone, a tablet computer, and a portable wearable device. The server 104 may be implemented by an independent server or a server cluster including a plurality of servers.

In this embodiment of the present disclosure, the terminal 102 and the server 104 may be independently configured to perform the method for updating the recommendation model, and the terminal 102 may also cooperate with the server 104 to perform the method for updating the recommendation model.

Figure 2:
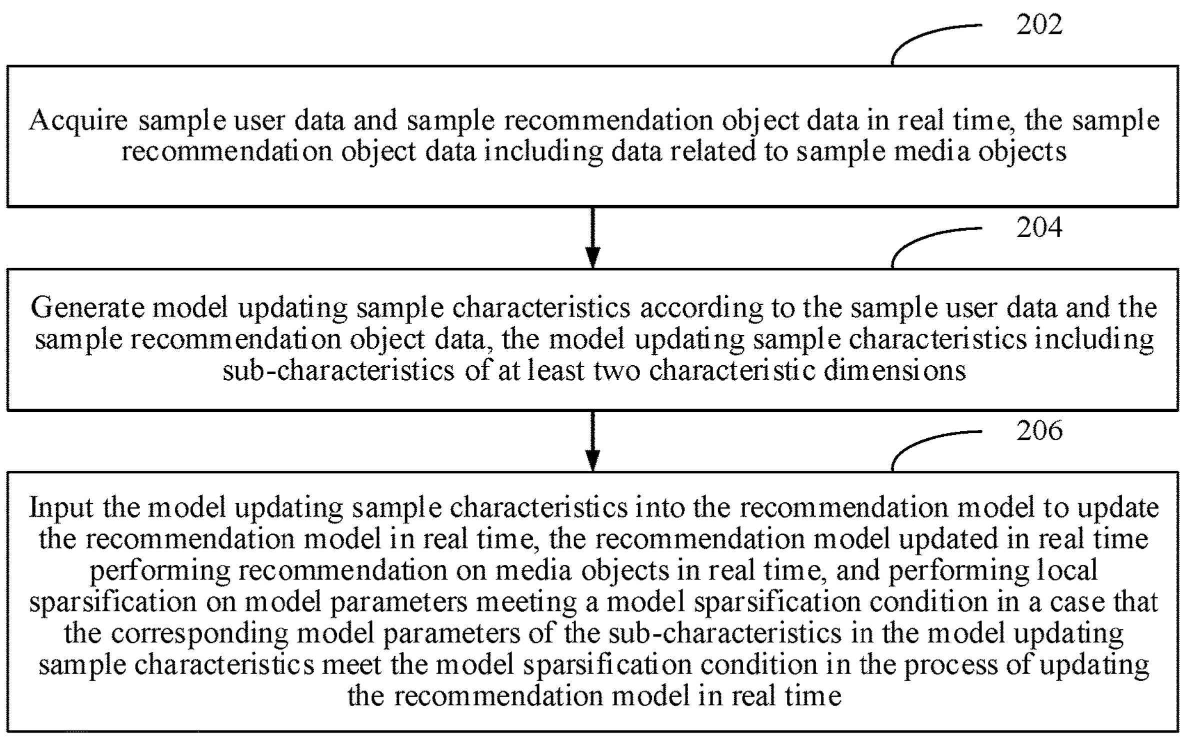
FIG. 2 is a schematic flowchart of a method for updating a recommendation model according to certain embodiment(s) of the present disclosure.

In one embodiment, as shown in FIG. 2, the method for updating the recommendation model is provided, performed by a computing device which may be the server or the terminal in FIG. 1, and the method includes the following steps:

Step 202: Acquire sample user data and sample recommendation object data in real time, the sample recommendation object data including data related to sample media objects.

In the embodiment, the sample user data refers to data of sample users. The sample user data may include user data. The user data is data reflecting user attributes. The user data includes user identifiers, gender, age, location, hobbies, interests or education background, etc. The sample user data may also include user behavior data. The user behavior data is data reflecting user behavior characteristics. The user behavior data includes social behavior data, etc. The social behavior data includes information of viewing, giving a like, commenting, forwarding and collecting of media data, etc. The media data may be articles, videos, pictures, etc.

The sample recommendation object data refers to data of the recommendation objects serving as samples. The sample recommendation objects refer to objects recommended to a user terminal. In the present disclosure, the recommendation objects may be media objects, and thus, the sample recommendation object data includes data related to the sample media objects. The sample media objects refer to media objects serving as samples. The media objects are data objects transmitted through an electronic device serving as a medium, and may be articles, pictures, videos, files to be downloaded, advertisements, or the like. The data related to the sample media objects may be identifiers of the sample media objects, data of the sample media objects themselves, interactive data between the sample media objects and the users, etc. The interactive data between the sample media objects and the users may be the number of times the sample media objects are viewed, the number of times the sample media objects are downloaded, the number of times the sample media objects are forwarded, the number of times the sample media objects are collected, the data the sample media objects are given a like, or the comment information of the users on the sample media objects, etc., which is not limited.

In certain embodiment(s), the computing device collects the user data and the recommendation object data from each user terminal in real time as samples to obtain the sample user data and the sample recommendation object data. The computing device may also acquire the user data and the recommendation object data from a database in real time as samples, to obtain the sample user data and the sample recommendation object data. The user data and the recommendation object data collected by the computing device in advance or currently are stored in the database.

In one scene, the computing device communicates with each user terminal through a network. The computing device may preset the sample users, thus acquiring the data of the user terminal of the sample user in real time. When or in response to determining that the user terminal of the sample user receives a trigger operation of the user, the computing device may acquire the sample user data and the sample recommendation object data generated by the sample user terminal in real time. The trigger operation of the user may be viewing, giving a like, collecting, forwarding, downloading, commenting, etc. Corresponding data may be generated through the trigger operation of the user.

Step 204: Generate model updating sample characteristics according to the sample user data and the sample recommendation object data, the model updating sample characteristics including sub-characteristics of at least two characteristic dimensions.

The model updating sample characteristics refer to sample characteristics used for updating the recommendation model. The model updating sample characteristics include sub-characteristics of at least two characteristic dimensions. The sub-characteristics of different characteristic dimensions reflect the features of the model updating sample characteristics at different characteristic levels. The sub-characteristics here may be user characteristic dimensions and may also be characteristic dimensions at a recommendation object level. For example, in a video recommendation scene, the characteristic dimensions at the user level include whether to view or not, whether to give a like or not, whether to forward or not, whether to download or not, etc., and the characteristic dimensions at the recommendation object level include the number of viewing times, the number of like giving times, the number of forwarding times, the number of downloading times, etc.

In one implementation, the computing device splices the sample user data and the sample recommendation object data to generate model updating sample characteristics. The splicing mode is not limited. For example, the sample recommendation object data may be spliced following the sample user data, and the sample user data may also be spliced following the sample recommendation object data.

In another implementation, the computing device summarizes the sample user data and the sample recommendation object data to obtain the model updating sample characteristics.

The computing device may also generate the model updating sample characteristics according to the sample user data and the sample recommendation object data by other implementations, which is not limited.

Step 206: Input the model updating sample characteristics into the recommendation model to update the recommendation model in real time, the recommendation model updated in real time performing recommendation on media objects in real time, and performing local sparsification on model parameters meeting a model sparsification condition when or in response to determining that the corresponding model parameters of the sub-characteristics in the model updating sample characteristics meet the model sparsification condition in the process of updating the recommendation model in real time.

A recommendation system algorithm in the recommendation model is usually used for computing the "score" or "preference" of the users for the articles through a dot product operation between embedded vectors of the user and the articles. The embedded vectors of the users and the articles are obtained by performing linear transformation or nonlinear transformation on the characteristic vectors of the users and the articles respectively. The recommendation model may be a factorization machine (FM) model, a Wide & Deep model, a DeepFM model, etc.

The computing device inputs the model updating sample characteristics into the recommendation model in real time to update model parameters of the recommendation model in real time. The model parameters may include hyper-parameters of the recommendation model and the corresponding model parameters of the sub-characteristics. The hyper-parameters may include the number of convolution kernels, parameters in a convolution layer, the number of pooling layers, etc. The corresponding model parameters of the sub-characteristics may include weight parameters, implicit vector parameters, etc. The number of the corresponding model parameters of the sub-characteristics may be one or more.

The model sparsification condition refers to a constraint condition for performing sparsification treatment on the model parameters, and may be set as desirable. For example, the model sparsification condition may be a constraint condition for constraining the values of the corresponding model parameters of the sub-characteristics, and may also be a constraint condition for constraining the updating time of the corresponding model parameters of the sub-characteristics. In certain embodiment(s), the model sparsification condition may also be a constraint condition for constraining the number of model updating sample characteristics or the size of a remaining internal memory space in the recommendation model.

The sparsification treatment may be any one of setting the model parameters to be 0, removing the model parameters, filtering out the sub-characteristics, filtering out the model updating sample characteristics, etc. The local sparsification refers to sparsification treatment to local parameters of the model parameters meeting the model sparsification condition.

The computing device traverses the sub-characteristic of each characteristic dimension in the model updating sample characteristics and the corresponding model parameter of each sub-characteristic in the process of updating the recommendation model in real time, determines the model parameters meeting the model sparsification condition when or in response to determining that the corresponding model parameters of the sub-characteristics in the model updating sample characteristics meet the model sparsification condition, and performs local sparsification on the model parameters.

In one embodiment, in the process of updating the recommendation model, the recommendation model is trained by adopting the following calculation formula to update the model parameters of the recommendation model:

$$\hat{y} = \sigma\left(\omega_0 + \sum_{i=1}^{N}\omega_i \times x_i + \sum_{i=1}^{N}\sum_{j=i+1}^{N}\langle\vec{v_i}, \vec{v_j}\rangle x_i \times x_j\right)$$

where $x=\{x_1, x_2, \ldots, x_i, \ldots x_j, \ldots x_N\}$ represents a model updating sample characteristic, $\sigma$ represents a preset parameter, $\omega_0$ represents a preset one-dimensional parameter, $x_i$ represents an $i^{th}$ sub-characteristic of x, $\omega_i$ represents a one-dimensional weight parameter corresponding to $x_i$, $\vec{V}_1$ and $\vec{V}_J$ represent k-dimensional implicit vector parameters, $\vec{V}_1$ represents an implicit vector parameter corresponding to $x_i$, and N represents a number of the sub-characteristics. If x is generated by user data of a user A and media object data of a media object 1, y is a probability that the recommendation model recommends the media object 1 to the user A. The one-dimensional weight parameter $\omega_i$, and the k-dimensional implicit vector parameters $\vec{V}_1$ and $\vec{V}_J$ are all learned by training the recommendation model.

According to the above formula, for one sub-characteristic, l+k floating point type parameter spaces are developed for the sub-characteristic. Therefore, with the increase of the model updating sample characteristics of the recommendation model, the internal memory space of the recommendation model will be gradually consumed, and when or in response to determining that the internal memory consumption of the recommendation model is large, the internal memory loading time and the recommendation model prediction time will be greatly increased.

However, in the embodiment, on one hand, by acquiring the sample user data and the sample recommendation object data in real time to generate the model updating sample characteristics, online data changes can be captured in time; by inputting the model updating sample characteristics into the recommendation model to update the recommendation model in real time, the recommendation model can be updated online, and the timeliness of the recommendation model can be effectively guaranteed; and therefore, when the recommendation model updated in real time is used for recommending the media objects in real time, the timeliness of the recommended media objects can be effectively guaranteed. On the other hand, since the model updating samples include the sub-characteristics of at least two characteristic dimensions, the operation of performing local sparsification on the model parameters meeting the model sparsification condition when or in response to determining that corresponding model parameters of the sub-characteristics in the model updating sample characteristics meet the model sparsification condition in the process of updating the recommendation model in real time is realized. Thus the model parameters can be subjected to sparsification treatment in the process of updating the recommendation model in real time. The complexity of the model parameters in the recommendation model is reduced. The quick expansion of the model parameters of the recommendation model under long running is avoided. As a result, the consumption of the internal memory space of the recommendation model can be reduced.

Figure 3:
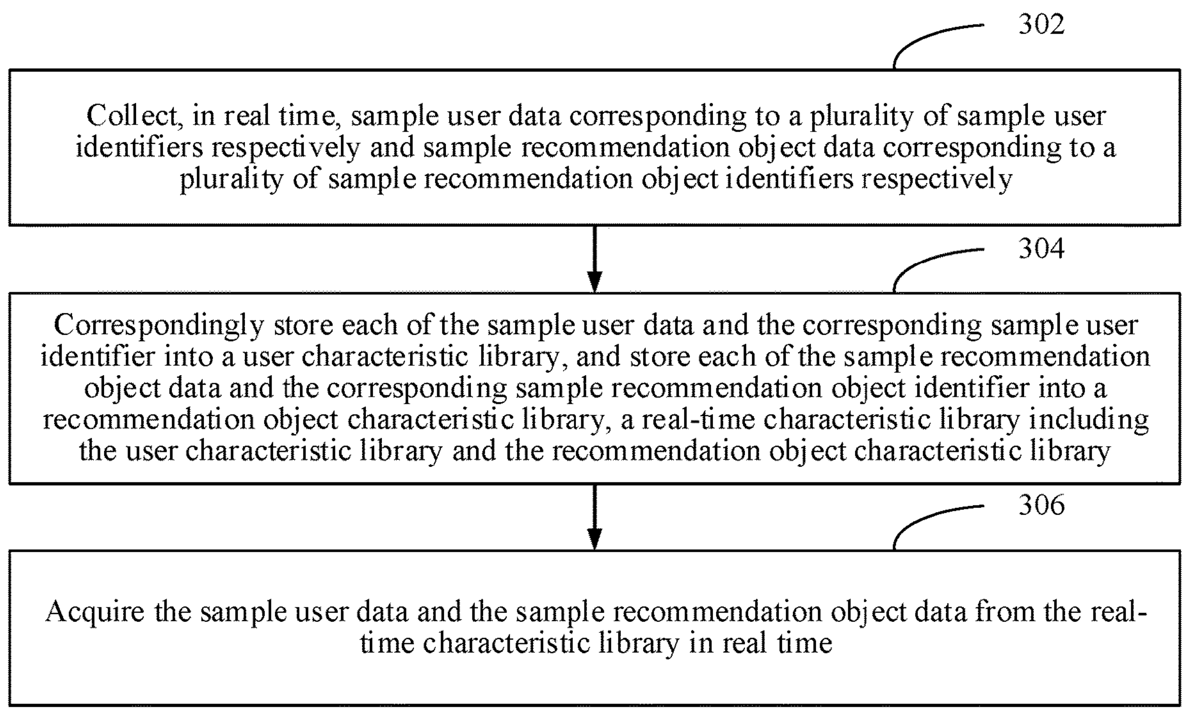
FIG. 3 is a schematic flow diagram of an operation of acquiring sample user data and sample recommendation object data according to certain embodiment(s) of the present disclosure.

In one embodiment, as shown in FIG. 3, acquiring sample user data and sample recommendation object data in real time includes the following steps:

Step 302: Collect, in real time, sample user data corresponding to a plurality of sample user identifiers respectively and sample recommendation object data corresponding to a plurality of sample recommendation object identifiers respectively.

The sample user identifiers refer to identifiers of sample users. The sample user identifiers are in one-to-one correspondence with the sample user data. The sample recommendation object identifiers refer to identifiers of sample recommendation objects. The sample recommendation object identifiers are in one-to-one correspondence with the sample recommendation object data.

It is to be understood that in a general scene, after new sample user identifiers or new sample recommendation object identifiers are generated, the computing device may collect other sample user data corresponding to the new sample user identifiers (or sample recommendation object identifiers) in real time. The sample user identifiers are also the sample user data. For existing sample user identifiers or sample recommendation object identifiers, the computing device may also collect newly added sample user data corresponding to these sample user identifiers (or sample recommendation object identifiers) in real time.

Step 304: Correspondingly store each of the sample user data and the corresponding sample user identifier into a user characteristic library, and store each of the sample recommendation object data and the corresponding sample recommendation object identifier into a recommendation object characteristic library, a real-time characteristic library including the user characteristic library and the recommendation object characteristic library.

The real-time characteristic library refers to a real-time access characteristic library. The real-time characteristic library includes the user characteristic library and the recommendation object characteristic library, namely the user characteristic library and the recommendation object characteristic library are both real-time access characteristic libraries.

In certain embodiment(s), the computing device correspondingly stores each sample user data and the corresponding sample user identifier into the user characteristic library according to a key–value mode. The key represents each sample user identifier, and the value represents each sample user data. The computing device also stores each sample recommendation object data and the corresponding sample recommendation object identifier into the recommendation object characteristic library according to a key–value mode. The key represents each sample recommendation object identifier, and the value represents each sample recommendation object data.

Step 306: Acquire the sample user data and the sample recommendation object data from the real-time characteristic library in real time.

The computing device acquires the sample user data from the user characteristic library of the real-time characteristic library through key–value operation in real time, and acquires the sample recommendation object data from the recommendation object characteristic library of the real-time characteristic library through key-value operation in real time.

In certain embodiment(s), the computing device determines the sample user identifiers, matches the sample user identifiers with all keys stored in the user characteristic library, and acquires the values corresponding to the matched keys, where the values are the sample user data. The computing device determines the sample recommendation object identifiers, matches the sample recommendation object identifiers with all keys stored in the recommendation object characteristic library, and acquires the values corresponding to the matched keys, where the values are the sample recommendation object data.

In one embodiment, since the sample user identifiers are also the sample user data, and the sample recommendation object identifiers are also the sample recommendation object data, the sample user data acquired by the computing device in real time from the user characteristic library of the real-time characteristic library through the key-value operation is key+value, and the sample recommendation object data acquired by the computing device in real time from the recommendation object characteristic library of the real-time characteristic library through the key-value operation is also key+value.

In the embodiment, the computing device collects, in real time, sample user data corresponding to a plurality of sample user identifiers respectively and sample recommendation object data corresponding to a plurality of sample recommendation object identifiers respectively; and correspondingly stores each of the sample user data and the corresponding sample user identifier into a user characteristic library, and stores each of the sample recommendation object data and the corresponding sample recommendation object identifier into a recommendation object characteristic library, a real-time characteristic library including the user characteristic library and the recommendation object characteristic library. The sample user data and the sample recommendation object data may be acquired from the real-time characteristic library in real time to generate the model updating sample characteristics in real time as well as update the recommendation model in real time.

Figure 4:
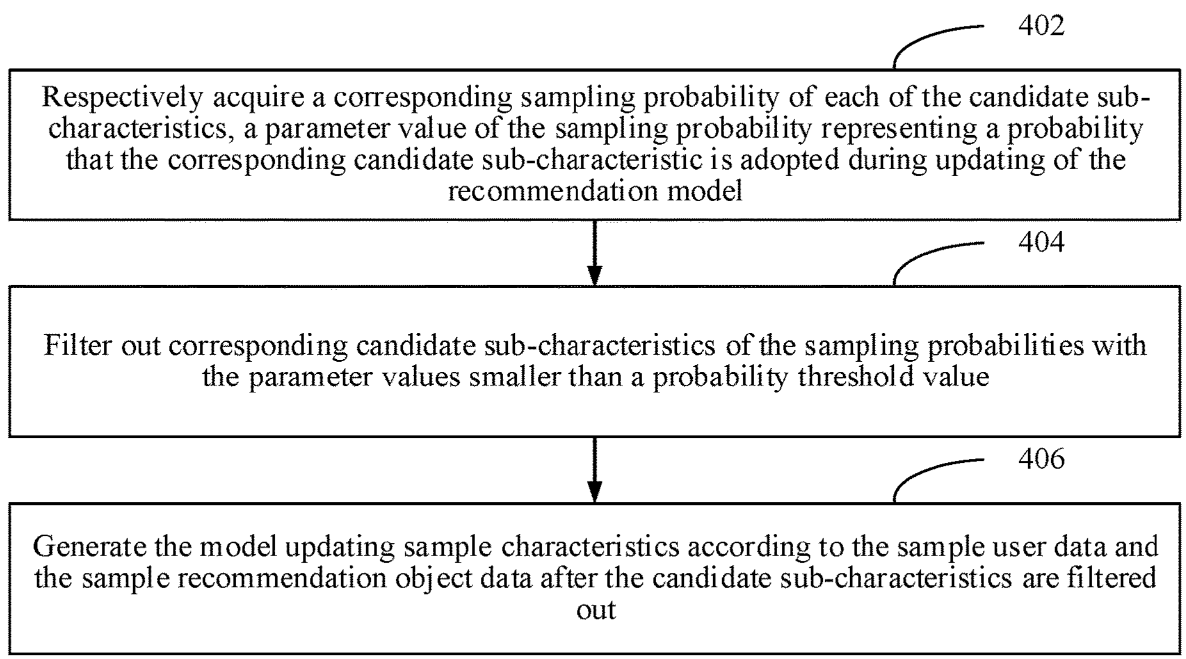
FIG. 4 is a schematic flow diagram of an operation of generating model updating sample characteristics according to certain embodiment(s) of the present disclosure.

In one embodiment, the sample user data includes a candidate sub-characteristic of at least one characteristic dimension. The sample recommendation object data includes a candidate sub-characteristic of at least one characteristic dimension. The model updating sample characteristics include target sub-characteristics of at least two characteristic dimensions. As shown in FIG. 4, generating the model updating sample characteristics according to the sample user data and the sample recommendation object data includes the following steps:

Step 402: Respectively acquire a corresponding sampling probability of each of the candidate sub-characteristics, a parameter value of the sampling probability representing a probability that the corresponding candidate sub-characteristic is adopted during updating of the recommendation model.

The candidate sub-characteristics are sub-characteristics included in the sample user data or the sample recommendation object data. The target sub-characteristics are the sub-characteristics included in the model updating sample characteristics.

It is to be understood that during generating the model updating sample characteristics according to the sample user data and the sample recommendation object data, the sub-characteristics included in the sample user data and the sample recommendation object data may be adopted or not be adopted, and the sub-characteristics included in the sample user data and the sample recommendation object data may be referred to as the candidate sub-characteristics. When or in response to determining that the sub-characteristics included in the sample user data and the sample recommendation object data of the candidate sub-characteristics are adopted, the sub-characteristics are used for generating the sub-characteristics included in the model updating sample characteristics, namely the target sub-characteristics.

In certain embodiment(s), the computing device acquires the sampling probability of the candidate sub-characteristic of at least one characteristic dimension included in each of the sample user data respectively and acquires the sampling probability of the candidate sub-characteristic of at least one characteristic dimension included in each of the sample recommendation object data respectively. For example, when or in response to determining that the sampling probability of the candidate sub-characteristic A is 80%, the probability that the candidate sub-characteristic A is adopted during updating of the recommendation model is 80%, and when or in response to determining that the sampling probability of the candidate sub-characteristic B is 25%, the probability that the candidate sub-characteristic B is adopted during updating of the recommendation model is 25%. The sampling probability may be represented by percentage or fraction. This is not limited in the present disclosure.

Step 404: Filter out the corresponding candidate sub-characteristics of the sampling probabilities with the parameter values smaller than a probability threshold value.

The probability threshold value may be set as desirable. For example, the probability threshold value may be set to be 50% or 70%.

The computing device compares the corresponding sampling probability of each of the candidate sub-characteristics with the probability threshold value, determines the corresponding candidate sub-characteristic of the sampling probability with the parameter values smaller than the probability threshold value, and filters out the candidate sub-characteristic, that is, removes the candidate sub-characteristic.

For example, the sample user data includes the candidate sub-characteristic A of one characteristic dimension, and the parameter value of the corresponding sampling probability of the candidate sub-characteristic A is 65%. The sample recommendation object data includes the candidate sub-characteristics of two characteristic dimensions, namely the candidate sub-characteristic B and the candidate sub-characteristic C. When or in response to determining that the parameter value of the corresponding sampling probability of the candidate sub-characteristic B is 89%, the parameter value of the corresponding sampling probability of the candidate sub-characteristic C is 46%, and the probability threshold value is 60%, the corresponding candidate sub-characteristic of the sampling probability with the parameter value smaller than the probability threshold value is determined as C, and the candidate sub-characteristic C is filtered out, that is, the candidate sub-characteristic C is removed.

Step 406: Generate the model updating sample characteristics according to the sample user data and the sample recommendation object data after the candidate sub-characteristics are filtered out.

The candidate sub-characteristics in the sample user data are filtered out when or in response to determining that the sample user data includes the corresponding candidate sub-characteristics of the sampling probability with the parameter value smaller than the probability threshold value. The candidate sub-characteristics in the sample recommendation object data are filtered out when or in response to determining that the sample recommendation object data includes the corresponding candidate sub-characteristics of the sampling probability with the parameter value smaller than the probability threshold value. The model updating sample characteristics are generated according to the sample user data and the sample recommendation object data after the candidate sub-characteristics are filtered out.

In one implementation, the computing device splices the sample user data and the sample recommendation object data after the candidate sub-characteristics are filtered out to generate the model updating sample characteristics. The splicing mode is not limited. For example, the sample recommendation object data may be spliced following the sample user data, and the sample user data may also be spliced following the sample recommendation object data.

In another implementation, the computing device summarizes the sample user data and the sample recommendation object after the candidate sub-characteristics are filtered out to obtain the model updating sample characteristics.

In the embodiment, the corresponding sampling probability of each of the candidate sub-characteristics is desirable. During filtering out of the corresponding candidate sub-characteristics of the sampling probabilities with the parameter values smaller than the probability threshold value, the candidate sub-characteristics with the smaller probabilities adopted during updating of the recommendation model may be filtered out, and therefore the sparsification of the model updating sample characteristics is realized. The model parameters are subjected to sparsification treatment during updating of the recommendation model in real time, thus the complexity of the model parameters in the recommendation model is reduced, and the consumption of the internal memory space of the recommendation model is decreased.

In one embodiment, the sample user data and sample recommendation object data are acquired from the real-time characteristic library. Respectively acquiring the corresponding sampling probability of each of the candidate sub-characteristics includes: respectively acquiring a corresponding occurrence frequency of each of the candidate sub-characteristics in the real-time characteristic library; and calculating to obtain a corresponding sampling probability of each of the candidate sub-characteristics according to the preset probability and the corresponding occurrence frequency of each of the candidate sub-characteristics.

The computing device counts the corresponding occurrence frequency of each of the candidate sub-characteristics in the real-time characteristic library. The higher the occurrence frequency of the candidate sub-characteristic in the real-time characteristic library is, the higher the probability that the candidate sub-characteristic is adopted during updating of the recommendation model is, and the higher the confidence of the model parameters obtained during updating of the recommendation model in real time with the candidate sub-characteristic is.

In one implementation, the computing device multiplies the preset probability by the corresponding occurrence frequency of each candidate sub-characteristic, and calculates to obtain the corresponding sampling probability of each candidate sub-characteristic. For example, if the preset probability is 0.5%, the corresponding occurrence frequency of the candidate sub-characteristic A is 50, and the corresponding occurrence frequency of the candidate sub-characteristic B is 64, thus the corresponding sampling probability of the candidate sub-characteristic A is 0.5%*50=25%, and the corresponding sampling probability of the candidate sub-characteristic B is 0.5%*64=32%.

In another implementation, the computing device acquires a corresponding weight factor of the characteristic library to which each candidate sub-characteristic belongs, and calculates the corresponding sampling probability of each candidate sub-characteristic according to the preset probability, the corresponding occurrence frequency of each candidate sub-characteristic and the corresponding weight factor of the characteristic library to which each candidate sub-characteristic belongs. In certain embodiment(s), the computing device multiplies the preset probability, the corresponding occurrence frequency of each candidate sub-characteristic and the corresponding weight factor of the characteristic library to which each candidate sub-characteristic belongs, and calculates to obtain the corresponding sampling probability of each candidate sub-characteristic. For example, if the preset probability is 0.5%, the corresponding weight factor of the user characteristic library to which the candidate sub-characteristic A belongs is 1.6, the corresponding occurrence frequency of the candidate sub-characteristic A is 50, the corresponding weight factor of the user characteristic library to which the candidate sub-characteristic B belongs is 0.8, the corresponding occurrence frequency of the candidate sub-characteristic B is 64, thus the corresponding sampling probability of the candidate sub-characteristic A is 0.5%*50*1.6=40%, and the corresponding sampling probability of the candidate sub-characteristic B is 0.5%*64*0.8=25.6%.

The computing mode of the corresponding sampling probabilities of the candidate sub-characteristics is not limited and may be set according to user desirables.

In the embodiment, the corresponding occurrence frequency of each candidate sub-characteristic in the real-time characteristic library is acquired, and the corresponding sampling probability of each candidate sub-characteristic can be calculated according to the preset probability and the corresponding occurrence frequency of each candidate sub-characteristic. Moreover, regarding a candidate sub-characteristic with low occurrence frequency, the corresponding sampling probability is low, and the confidence of the model parameters obtained by updating is low if the recommendation model is subjected to training learning with the candidate sub-characteristic with low occurrence frequency. Therefore, the corresponding candidate sub-characteristics of the sampling probabilities with the parameter values smaller than the probability threshold value are filtered out, thus a more accurate model updating sample characteristic can be generated according to the sample user data and the sample recommendation object data after the candidate sub-characteristics are filtered out, the recommendation model can be updated more accurately in real time, and the updated recommendation model can be recommended more accurately in real time.

Figure 5:
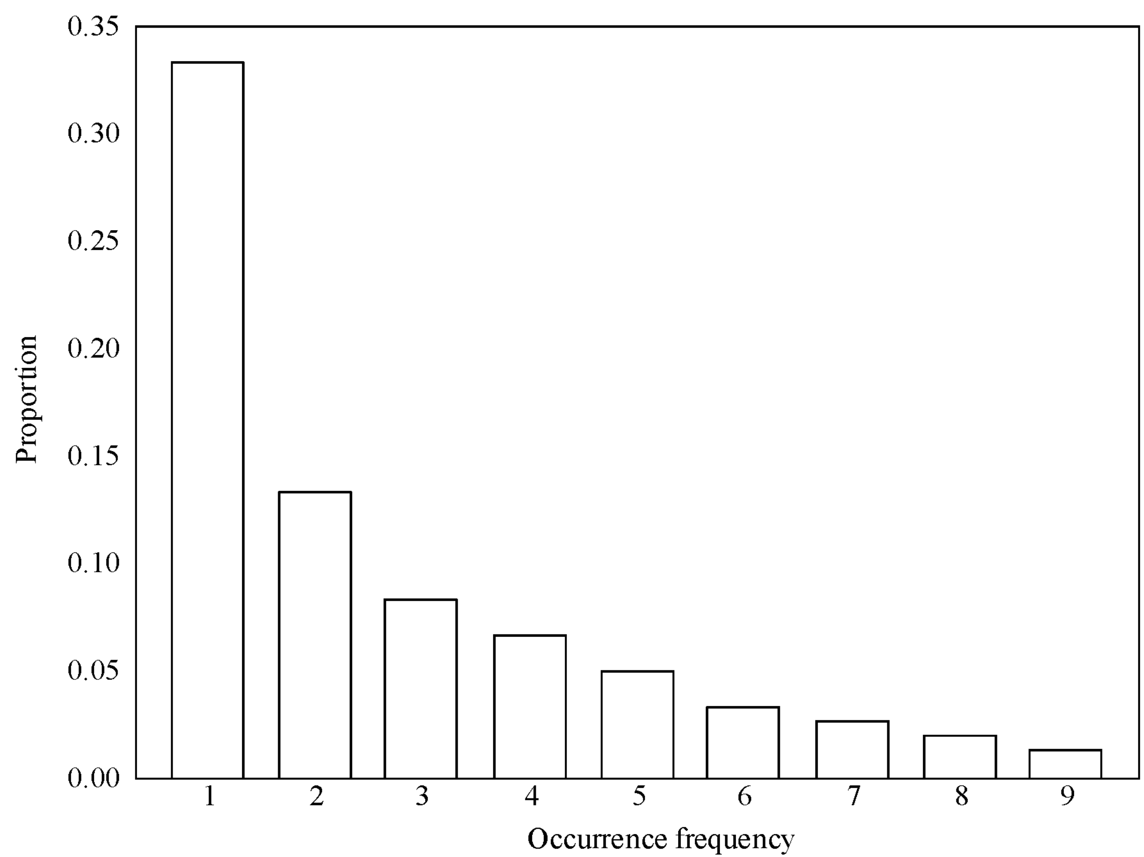
FIG. 5 is a schematic distribution diagram of an occurrence frequency of each candidate sub-characteristic according to certain embodiment(s) of the present disclosure.

FIG. 5 is a distribution diagram of an occurrence frequency of each candidate sub-characteristic in one embodiment. For example, the proportion of the candidate sub-characteristic with the occurrence frequency of 1 in all the candidate sub-characteristics in the real-time characteristic library is 0.41, the proportion of the candidate sub-characteristic with the occurrence frequency of 2 in all the candidate sub-characteristics in the real-time characteristic library is 0.13, and the proportion of the candidate sub-characteristic with the occurrence frequency of 5 in all the candidate sub-characteristics in the real-time characteristic library is 0.05. As shown in FIG. 5, the occurrence frequency distribution of each candidate sub-characteristic is in a long-tail form, and the candidate sub-characteristics with the occurrence frequency smaller than or equal to 3 account for more than 50% of all the candidate sub-characteristics. However, the candidate sub-characteristics with low occurrence frequency have a small effect on updating of model parameters of the recommendation model, and the candidate sub-characteristics with low occurrence frequency may be filtered out, so that the sparsification treatment of the recommendation model is realized. The model parameters are subjected to sparsification treatment, thus the complexity of the model parameters in the recommendation model is reduced, and the consumption of the internal memory space of the recommendation model is decreased.

Figure 6:
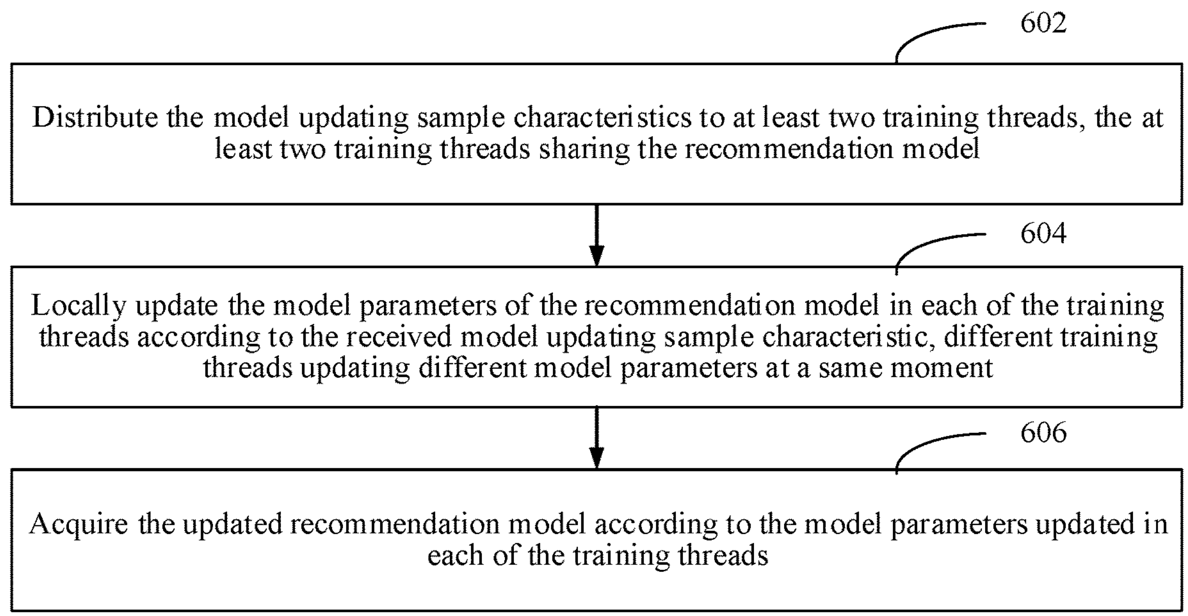
FIG. 6 is a schematic flow diagram of an operation of inputting the model updating sample characteristics into a recommendation model to update the recommendation model according to certain embodiment(s) of the present disclosure.

In one embodiment, as shown in FIG. 6, inputting the model updating sample characteristics into the recommendation model to update the recommendation model in real time includes the following steps:

Step 602: Distribute the model updating sample characteristics to at least two training threads, the at least two training threads sharing the recommendation model.

A thread is the smallest unit that an operating system may perform operation scheduling. The thread is included in a process and is an actual operation unit in the process. A plurality of threads may concur in one process, and each thread executes different tasks in parallel. The training threads are threads used for training the recommendation model to update the recommendation model.

That the at least two training threads share the recommendation model means that each training thread in the at least two training threads is used for updating the same recommendation model.

In certain embodiment(s), the computing device may evenly distribute the model updating sample characteristics to the at least two training threads and may also distribute the model updating sample characteristics to the at least two training threads according to the preset number of the threads.

Step 604: Locally update the model parameters of the recommendation model in each training thread according to the received model updating sample characteristic, different training threads updating different model parameters at the same moment.

In each training thread, when or in response to determining that the corresponding model parameters of the sub-characteristics in the model updating sample characteristics meet the model sparsification condition, local sparsification is performed on the model parameters meeting the model sparsification condition according to the received model updating sample characteristics, that is, the model parameters of the recommendation model are locally updated.

The computing device sets a lock function for each model parameter to control model parameters updated in different training threads at the same moment to be different. For example, at the same moment, the model parameter A can be updated in the training thread 1, the model parameter B can be updated in the training thread 2, the model parameter C can be updated in the training thread 3, thus the updating rate of the recommendation model can be increased, confusion caused by updating the model parameters of the recommendation model in a plurality of training threads can be avoided, and the updating accuracy of the recommendation model is improved.

In the embodiment, one or more model parameters can be regularly updated in each training thread, and different model parameters can also be dynamically updated as long as the model parameters updated in different training threads at the same moment are different, or one model parameter is only updated in one training thread at the same moment.

Step 606: Obtain the updated recommendation model according to the model parameters updated in each training thread.

After the model parameters are updated in the at least two training threads, the computing device acquires the model parameters updated in training thread to generate the updated recommendation model.

In one implementation, when the updating duration of the model parameters in each training thread reaches a specified duration, updating is stopped, the model parameters updated in each training thread are obtained, and therefore the updated recommendation model is generated.

In another implementation, when or in response to determining that the updating frequency of the model parameters in each training thread reaches a specified frequency, updating is stopped, the model parameters updated in each training thread are obtained, and therefore the updated recommendation model is generated.

In the embodiment, the model updating sample characteristics are distributed to the at least two training threads, the model parameters of the recommendation model are locally updated through the at least two training threads, and thus the efficiency of updating the recommendation model can be improved. Moreover, the model parameters updated in different training threads at the same time are different, so the confusion caused by updating the model parameters of the recommendation model in the plurality of training threads can be avoided, and the accuracy of updating the recommendation model is improved.

In one embodiment, before distributing the model updating sample characteristics to the at least two training threads, the method further includes: writing the model updating sample characteristics into a queue; reading the model updating sample characteristics from the queue in a streaming mode through a reading thread; and distributing the model updating sample characteristics to the at least two training threads, including: distributing the read model updating sample characteristics to the at least two training threads through the reading thread.

The queue is of a linear storage structure. After acquiring the model updating sample characteristics, the computing device writes the model updating sample characteristics into the queue according to the acquirement sequence.

The reading thread refers to a thread for reading data from the queue. The reading thread may be a TrainReader thread. The model updating sample characteristics may be read from the queue in a streaming mode through the TrainReader thread.

In another embodiment, the queue may further include a message queue and an internal memory queue. The computing device writes the model updating sample characteristics into the message queue. In the program, the model updating sample characteristics are acquired from the message queue in real time, and the model updating sample characteristics are written into the internal memory queue. The model updating sample characteristics are read from the internal memory queue in the streaming mode through the reading thread.

In the embodiment, the model updating sample characteristics are written into the queue; the model updating sample characteristics are read from the queue in the streaming mode through the reading thread; the read model updating sample characteristics are distributed to the at least two training threads through the reading thread; and the model updating sample characteristics are read in the streaming mode in real time, thus the timeliness of acquiring the updated sample characteristics can be improved, and as a result, the timeliness of updating the recommendation model is improved.

In one embodiment, performing local sparsification on the model parameters meeting the model sparsification condition when or in response to determining that the corresponding model parameters of the sub-characteristics in the model updating sample characteristics meet the model sparsification condition includes: performing local sparsification on the model parameters meeting the model sparsification condition when or in response to determining that the values of the corresponding model parameters of the sub-characteristics in the model updating sample characteristics meet the model sparsification condition.

The model sparsification condition may be set as desirable. For example, the model sparsification condition may be that the corresponding weight parameters of the sub-characteristics are smaller than the lower limit of weight, the time interval between the last updating moment and the current moment is greater than the preset interval, the data of the model updating sample characteristics reaches a specified quantity, the remaining internal memory space in the recommendation model is smaller than the specified threshold value, etc.

In one implementation, when or in response to determining that the values of the corresponding model parameters of the sub-characteristics in the model updating sample characteristics meet the model sparsification condition, the values of the model parameters may be set to be 0 to realize sparsification treatment on the model parameters.

In another implementation, when or in response to determining that the values of the corresponding model parameters of the sub-characteristics in the model updating sample characteristics meet the model sparsification condition, the model parameters meeting the model sparsification condition may be filtered out to realize sparsification treatment on the model parameters.

In another implementation, when or in response to determining that the values of the corresponding model parameters of the sub-characteristics in the model updating sample characteristics meet the model sparsification condition, the sub-characteristics to which the model parameters meeting the model sparsification condition belong may be determined, and the sub-characteristics are removed to realize sparsification treatment on the model parameters.

When or in response to determining that the values of the corresponding model parameters of the sub-characteristics in the model updating sample characteristics meet the model sparsification condition, the modes of performing local sparsification on the model parameters meeting the model sparsification condition are not limited and may be set as desirable.

Figure 7:
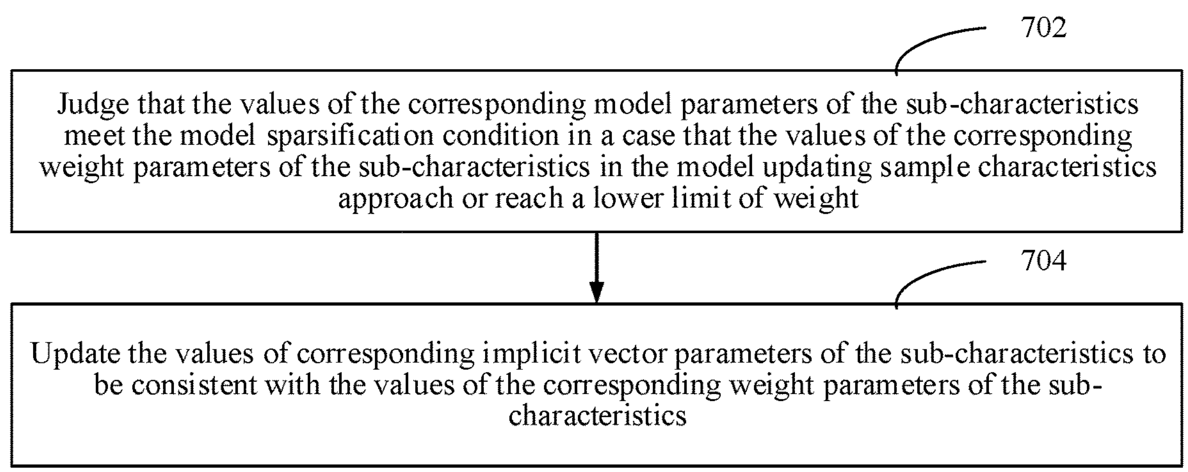
FIG. 7 is a schematic flow diagram of an operation of performing local sparsification on model parameters according to certain embodiment(s) of the present disclosure.

In one embodiment, the corresponding model parameters of the sub-characteristics include weight parameters and implicit vector parameters. As shown in FIG. 7, performing local sparsification on the model parameters meeting the model sparsification condition when or in response to determining that the values of the corresponding model parameters of the sub-characteristics in the model updating sample characteristics meet the model sparsification condition includes the following steps:

Step 702: Judge that the values of the corresponding model parameters of the sub-characteristics meet the model sparsification condition when or in response to determining that the values of the corresponding weight parameters of the sub-characteristics in the model updating sample characteristics approach or reach the lower limit of weight.

The weight parameters are parameters representing the weight of the sub-characteristics. The greater the values of the weight parameters of the sub-characteristics are, the more important the sub-characteristics are, and the greater the effect of the sub-characteristics on how the recommendation model learns to perform recommendation is. The smaller the values of the weight parameters of the sub-characteristics are, the less important the sub-characteristics are, and the less the effect of the sub-characteristics on how the recommendation model learns to perform recommendation is.

When or in response to determining that the values of the corresponding weight parameters of the sub-characteristics approach the lower limit of weight, the difference value between the values of the weight parameters and the lower limit of weight is in a small range. When or in response to determining that the values of the corresponding weight parameters of the sub-characteristics reach the lower limit of weight, the values of the weight parameters are consistent with the lower limit of weight.

The lower limit of weight may be set as desirable. The lower limit of weight may be set as a smaller value, such as 0 or 0.01.

When or in response to determining that the values of the corresponding weight parameters of the sub-characteristics in the model updating sample characteristics approach or reach the lower limit of weight, the sub-characteristics are not important, and it can be judged that the corresponding model parameters of the sub-characteristics meet the model sparsification condition.

Step 704: Update the values of the corresponding implicit vector parameters of the sub-characteristics to be consistent with the values of the corresponding weight parameters of the sub-characteristics.

When or in response to determining that the values of the corresponding weight parameters of the sub-characteristics in the model updating sample characteristics approach or reach the lower limit of weight, the sub-characteristics are not important, corresponding implicit vectors of the sub-characteristics are also not important, and the values of the corresponding implicit vector parameters of the sub-characteristics may be updated to be consistent with the values of the corresponding weight parameters of the sub-characteristics.

For example, the values of the corresponding weight parameters of the sub-characteristics in the model updating sample characteristics are 0, the lower limit of weight is 0. When or in response to determining that the values of the corresponding weight parameters of the sub-characteristics reach the lower limit of weight, it is judged that the values of the corresponding model parameters of the sub-characteristics meet the model sparsification condition, and the values of the corresponding implicit vector parameters of the sub-characteristics are updated to 0, namely, the values of the corresponding implicit vector parameters of the sub-characteristics are updated to be consistent with the values of the corresponding weight parameters of the sub-characteristics.

In another example, the values of the corresponding weight parameters of the sub-characteristics in the model updating sample characteristics are 0.0001, the lower limit of weight is 0. When or in response to determining that the values of the corresponding weight parameters of the sub-characteristics approach the lower limit of weight, it is judged that the values of the corresponding model parameters of the sub-characteristics meet the model sparsification condition, and the values of the corresponding implicit vector parameters of the sub-characteristics are updated to 0.0001, namely, the values of the corresponding implicit vector parameters of the sub-characteristics are updated to be consistent with the values of the corresponding weight parameters of the sub-characteristics.

In the embodiment, when or in response to determining that the values of the corresponding weight parameters of the sub-characteristics in the model updating sample characteristics approach or reach the lower limit of weight, it is judged that the values of the corresponding model parameters of the sub-characteristics meet the model sparsification condition, and the values of the corresponding implicit vector parameters of the sub-characteristics are updated to be consistent with the values of the corresponding weight parameters of the sub-characteristics. The model parameters may be subjected to sparsification treatment during updating of the recommendation model in real time, thus the complexity of the model parameters in the recommendation model is reduced, and the consumption of the internal memory space of the recommendation model is decreased.

In the embodiment, when or in response to determining that the values of the corresponding weight parameters of the sub-characteristics in the model updating sample characteristics reach the lower limit of weight, the computing device judges that the values of the corresponding model parameters of the sub-characteristics meet the model sparsification condition, and may update the values of the corresponding implicit vector parameters of the sub-characteristics to be consistent with the values of the corresponding weight parameters of the sub-characteristics, namely update the values to reach the lower limit of weight. When or in response to determining that the values of the corresponding weight parameters of the sub-characteristics in the model updating sample characteristics approach the lower limit of weight, the computing device judges that the values of the corresponding model parameters of the sub-characteristics meet the model sparsification condition, may update the values of the corresponding implicit vector parameters of the sub-characteristics to be consistent with the values of the corresponding weight parameters of the sub-characteristics, and may also update the values of the corresponding implicit vector parameters of the sub-characteristics and the values of the corresponding weight parameters of the sub-characteristics to reach the lower limit of weight.

Figure 8:
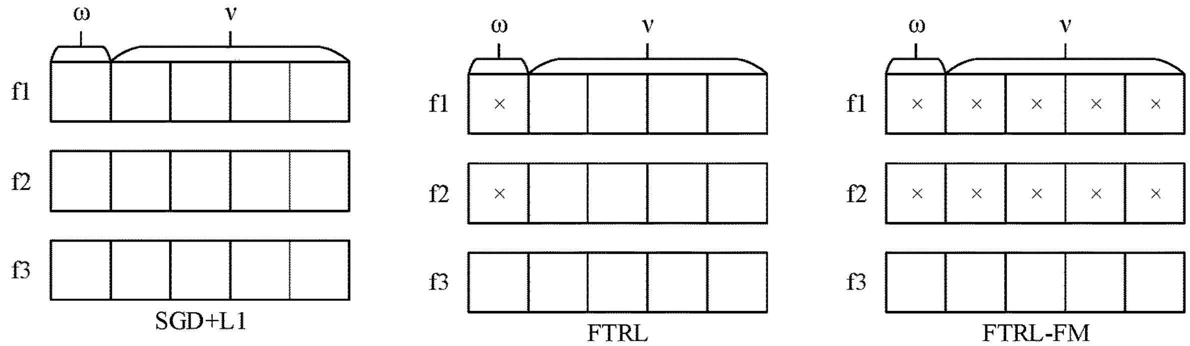
FIG. 8 is a schematic comparison diagram of different modes of reducing complexity of a recommendation model according to certain embodiment(s) of the present disclosure.

FIG. 8 is a comparison diagram of different modes of reducing complexity of the recommendation model in one embodiment. The SGD (Stochastic gradient descent) algorithm+L1 mode is adopted to enable most weight parameters ω of characteristics (f1, f2 and f3) to be close to 0, but enable the probability that the implicit vector parameter ν of the characteristics is equal to 0 to be almost zero. The FTRL (Follow-the-regulated-Leader) mode is adopted. If the weight parameters ω of the characteristics is 0, the weight parameters of the characteristics can be deleted, but once there is one sub-parameter, not 0, in the implicit vector parameters ν of the characteristics, the whole implicit vector parameters ν cannot be deleted. Therefore, when or in response to determining that the sparsification is performed on the recommendation model through the FTRL method, only the weight parameters ω of the characteristics are subjected to sparsification, while the implicit vector parameters ν are difficult to delete.

An FTRL mode special for the recommendation model is adopted in the present disclosure. When or in response to determining that the values of the corresponding weight parameters ω of the sub-characteristics in the model updating sample characteristics reach 0, the sub-characteristics are not important, and it is judged that the values of the corresponding model parameters ω of the sub-characteristics meet the model sparsification condition. The values of the corresponding implicit vector parameters ν of the sub-characteristics are updated to be consistent with the values of the corresponding weight parameter ω of the sub-characteristics, that is, the values of the implicit vector parameters ν are also updated to 0. Therefore, the sparsification treatment on the model parameters of the sub-characteristics is realized, the complexity of the recommendation model can be reduced, and the consumption of the internal memory space of the recommendation model is decreased.

In one embodiment, performing local sparsification on the model parameters meeting the model sparsification condition when or in response to determining that the corresponding model parameters of the sub-characteristics in the model updating sample characteristics meet the model sparsification condition includes: performing local sparsification on model parameters meeting a model sparsification condition when or in response to determining that the updating time of the corresponding model parameters of the sub-characteristics in the model updating sample characteristics meets the model sparsification condition.

The model sparsification condition may be set as desirable. For example, the model sparsification condition may be a constraint condition for constraining the updating time of the model parameters. For example, the updating time of the corresponding model parameters of the sub-characteristics is later than a specified time, and the time interval between the last update time of the corresponding model parameters of the sub-characteristics and the current time is greater than the preset interval.

When or in response to determining that the computing device updates the corresponding model parameters of the sub-characteristics in the model updating sample characteristics, the current updating time may be recorded. When or in response to determining that the updating time meets the model sparsification condition, local sparsification is performed on the model parameters meeting the model sparsification condition. The model parameters are subjected to sparsification treatment during updating of the recommendation model in real time. Thus the complexity of the model parameters in the recommendation model can be reduced. As a result, the consumption of the internal memory space of the recommendation model is decreased.

In one implementation, when or in response to determining that the updating time of the corresponding model parameters of the sub-characteristics in the model updating sample characteristics meets the model sparsification condition, the values of the model parameters may be set as preset numerical values, for example, the values of the model parameters are set as 0, and thus sparsification treatment on the model parameters is realized.

In another implementation, when or in response to determining that the updating time of the corresponding model parameters of the sub-characteristics in the model updating sample characteristics meets the model sparsification condition, the model parameters meeting the model sparsification condition may be filtered out to realize sparsification treatment on the model parameters.

In another implementation, when or in response to determining that the updating time of the corresponding model parameters of the sub-characteristics in the model updating sample characteristics meets the model sparsification condition, the sub-characteristics to which the model parameters meeting the model sparsification condition belong may be determined, and the sub-characteristics are removed to realize sparsification treatment on the model parameters.

When or in response to determining that the updating time of the corresponding model parameters of the sub-characteristics in the model updating sample characteristics meets the model sparsification condition, the modes of performing local sparsification on the model parameters meeting the model sparsification condition are not limited and may be set as desirable.

Figure 9:
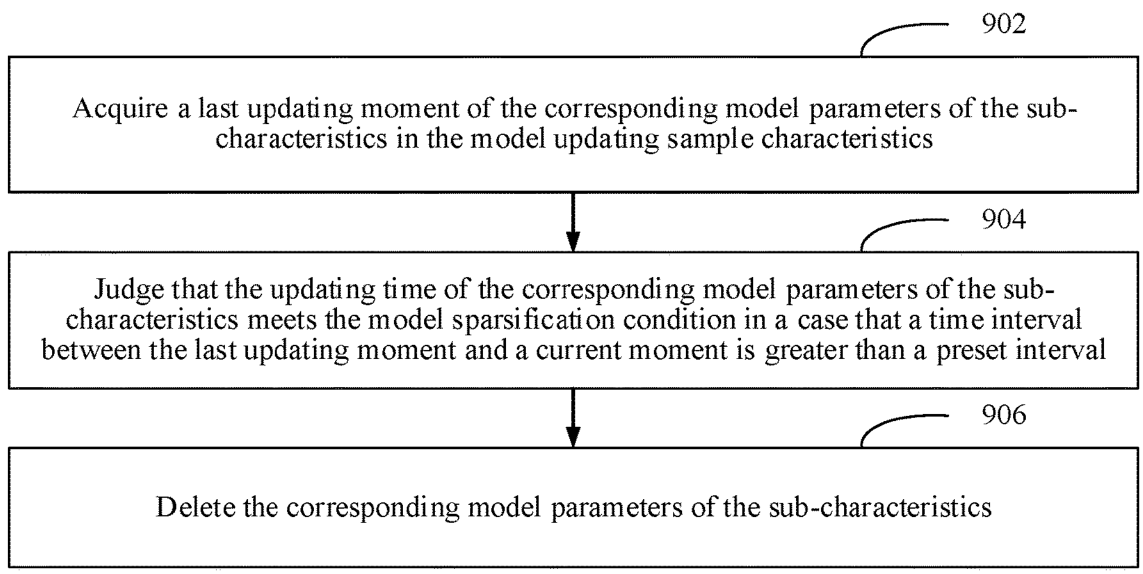
FIG. 9 is a schematic flow diagram of an operation of performing local sparsification on model parameters according to certain embodiment(s) of the present disclosure.

In one embodiment, as shown in FIG. 9, the performing local sparsification on the model parameters meeting the model sparsification condition when or in response to determining that the updating time of the corresponding model parameters of the sub-characteristics in the model updating sample characteristics meets the model sparsification condition includes the following steps:

Step 902: Acquire a last updating moment of the corresponding model parameters of the sub-characteristics in the model updating sample characteristics.

The last updating moment of the corresponding model parameters of the sub-characteristics refers to the last moment when the corresponding model parameters of the sub-characteristics are updated.

When or in response to determining that the computing device updates the corresponding model parameters of the sub-characteristics in the model updating sample characteristics each time, the current updating moment may be recorded and stored, and the current updating moment may also replace the previous updating moment.

In one implementation, the computing device traverses the corresponding model parameters of the sub-characteristics in the model updating sample characteristics at preset time intervals to obtain the last updating moment of the corresponding model parameters of the sub-characteristics in the model updating sample characteristics.

In another implementation, during storing of the updated recommendation model, the computing device traverses the corresponding model parameters of the sub-characteristics in the model updating sample characteristics to obtain the last updating moment of the corresponding model parameters of the sub-characteristics in the model updating sample characteristics.

Step 904: Judge that the updating time of the corresponding model parameters of the sub-characteristics meets the model sparsification condition when or in response to determining that a time interval between the last updating moment and a current moment is greater than a preset interval.

The preset interval may be set as desirable. For example, the preset interval may be 3 min, 20 min, and 24 h.

The computing device acquires the current moment and calculates the time interval between the last updating moment and the current moment. When or in response to determining that the time interval is greater than the preset interval, the interval between the last updating moment of the corresponding model parameters of the sub-characteristics and the current moment is large, and the sub-characteristics possibly lose efficacy or are outdated, it is judged that the updating time of the corresponding model parameters of the sub-characteristics meets the model sparsification condition.

Step 906: Delete the corresponding model parameters of the sub-characteristics.

The computing device determines the corresponding model parameters of the sub-characteristics meeting the model sparsification conditions, and deletes the corresponding model parameters of the sub-characteristics, namely, performs sparsification treatment on the model parameters of the recommendation model. Thus the complexity of the model parameters in the recommendation model may be reduced, and consumption of the internal memory space of the recommendation model is decreased.

In one embodiment, a plurality of model updating sample characteristics are provided. After deleting the corresponding model parameters of the sub-characteristics, the method described above further includes: determining the corresponding sub-characteristics with the model parameters deleted as elimination objects; and deleting the elimination objects from the model updating sample characteristics without being input into the recommendation model.

The elimination objects refer to the sub-characteristics with the updating time of the model parameters meeting the model sparsification condition.

It is to be understood that when or in response to determining that the time interval between the last updating moment of the corresponding model parameters of the sub-characteristics and the current moment is greater than the preset interval, the corresponding model parameters of the sub-characteristics may be outdated, and the sub-characteristics may also be outdated. The corresponding model parameters of the sub-characteristics are deleted. The corresponding sub-characteristics with the model parameters deleted are determined as the elimination objects. The elimination objects are deleted from the model updating sample characteristics without being input into the recommendation model. The model parameters of the recommendation model may be subjected to sparsification treatment, thus the complexity of the model parameters in the recommendation model is reduced, and the consumption of the internal memory space of the recommendation model is decreased.

The computing device updates the recommendation model in real time. The model updating sample characteristics are acquired in the real-time updating process. When it is judged that the updating time of the corresponding model parameters of the sub-characteristics meets the model sparsification condition, the sub-characteristics may be outdated, and the sub-characteristics are deleted. Thus the problem that the model updating sample characteristics include the outdated sub-characteristics, and consequently the recommendation model is updated during updating of the recommendation model in the next time. The recommendation model may be updated in real time, thus the timeliness of updating the recommendation model is improved, and the accuracy of updating the recommendation model is also improved.

It is to be understood that in an article recommendation scene, the real-time performance is high, new article characteristics are generated at any time, and meanwhile, a large number of article characteristics are not suitable for being used as training data of the recommendation model as the time passed. When or in response to determining that the article characteristics are used as the elimination objects, the probability that the elimination objects are adopted in the process of updating the recommendation model is low, so the elimination objects may be deleted.

In one embodiment, after deleting the elimination objects from the model updating sample characteristics without being input into the recommendation model, the method further includes: deleting the corresponding model updating sample characteristics of the elimination objects.

It is to be understood that when or in response to determining that time interval between the last updating moment of the corresponding model parameters of the sub-characteristics and the current moment is greater than the preset interval, the corresponding model parameters of the sub-characteristics may be outdated, the sub-characteristics may also be outdated, and the corresponding model updating sample characteristics of the sub-characteristics, namely the model updating sample characteristics to which the sub-characteristics belong, may be outdated. The corresponding model updating sample characteristics of the elimination objects are deleted, namely the model parameters included in the model updating sample characteristics are be deleted. The model parameters of the recommendation model may be subjected to sparsification treatment, thus the complexity of the model parameters in the recommendation model is reduced, and the consumption of the internal memory space of the recommendation model is decreased.

In one embodiment, performing local sparsification on the model parameters meeting the model sparsification condition when or in response to determining that the corresponding model parameters of the sub-characteristics in the model updating sample characteristics meet the model sparsification condition includes: performing local sparsification on the model parameters meeting the model sparsification condition when or in response to determining that the values of the corresponding model parameters of the sub-characteristics in the model updating sample characteristics meet the model sparsification condition; and performing local sparsification on model parameters meeting a model sparsification condition when or in response to determining that the updating time of the corresponding model parameters of the sub-characteristics in the model updating sample characteristics meets the model sparsification condition.

In one embodiment, the corresponding model parameters of the sub-characteristics include the weight parameters and the implicit vector parameters. Performing local sparsification on the model parameters meeting the model sparsification condition when or in response to determining that the values of the corresponding model parameters of the sub-characteristics in the model updating sample characteristics meet the model sparsification condition includes: judging that the values of the corresponding model parameters of the sub-characteristics meet the model sparsification condition when or in response to determining that the values of the corresponding weight parameters of the sub-characteristics in the model updating sample characteristics approach or reach a lower limit of weight; and updating the values of the corresponding implicit vector parameters of the sub-characteristics to be consistent with the values of the corresponding weight parameters of the sub-characteristics.

In one embodiment, performing local sparsification on the model parameters meeting the model sparsification condition when or in response to determining that the updating time of the corresponding model parameters of the sub-characteristics in the model updating sample characteristics meets the model sparsification condition includes: acquiring a last updating moment of the corresponding model parameters of the sub-characteristics in the model updating sample characteristics; judging that the updating time of the corresponding model parameters of the sub-characteristics meets the model sparsification condition when or in response to determining that a time interval between the last updating moment and a current moment is greater than a preset interval; and deleting the corresponding model parameters of the sub-characteristics.

In one embodiment, a plurality of model updating sample characteristics are provided. After detecting the corresponding model parameters of the sub-characteristics, the method further includes: determining the corresponding sub-characteristics with the model parameters deleted as elimination objects; and deleting the elimination objects from the model updating sample characteristics without being input into the recommendation model.

In one embodiment, after performing local sparsification on the model parameters meeting the model sparsification condition when or in response to determining that the corresponding model parameters of the sub-characteristics in the model updating sample characteristics meet the model sparsification condition, the method further includes: storing the recommendation model updated at a current moment when or in response to determining that a timing duration for updating the recommendation model in real time reaches a preset duration, resetting the timing duration, and updating the recommendation model in real time; and recommending the media objects in real time through the last stored recommendation model.

The preset duration may be set as desirable. For example, the preset duration may be 1 min or 30 seconds, which is not limited.

When or in response to determining that the timing duration of updating the recommendation model in real time reaches the preset duration, the recommendation model updated at the current moment is restored, and the timing duration is reset. Namely the timing of the updating of the recommendation model is restarted, and the recommendation model is updated in real time.

The computing device recommends the media objects in real time through the last stored recommendation model. The media objects may be recommended through the last stored recommendation model.

In one embodiment, the last stored recommendation model is adopted in a recommendation thread to recommend the media objects in real time. The recommendation thread is a thread for recommending the media objects in real time. The computing device may open the recommendation thread in advance, acquire the last stored recommendation model through the recommendation thread, and recommend the media objects in real time by the last stored recommendation model.

The model is applied after being trained or updated, and the model cannot continue to be trained or updated in the implementation process. However, in the embodiment, by opening the new recommendation thread, the recommendation model can recommend the media objects in the recommendation thread. Meanwhile, the recommendation model can be updated in real time, and thus the efficiency of synergy of the recommendation model between implementation and training or updating is improved.

Figure 10:
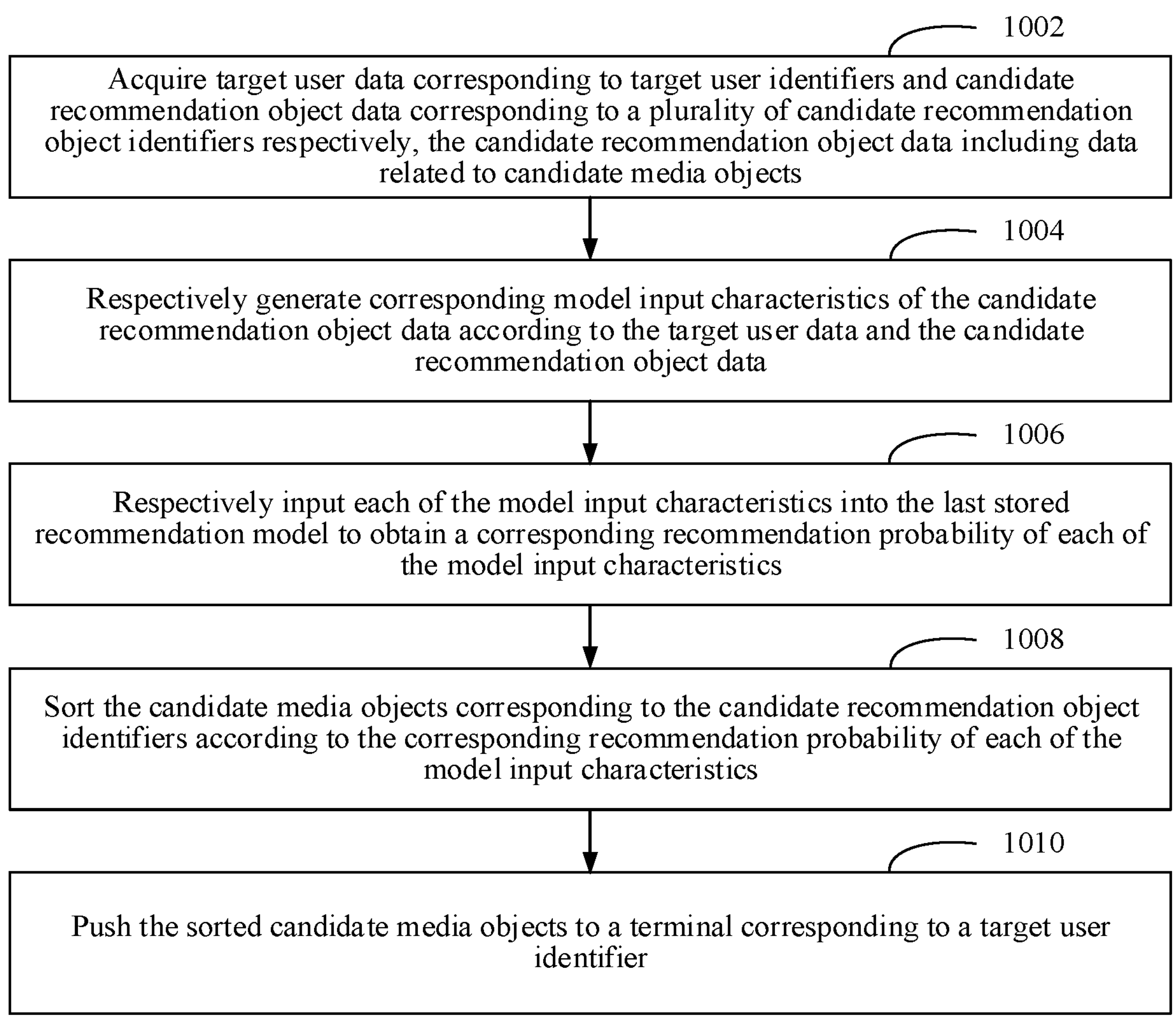
FIG. 10 is a schematic flow diagram of an operation of recommending media objects according to certain embodiment(s) of the present disclosure.

In one embodiment, as shown in FIG. 10, recommending the media objects in real time through the last stored recommendation model includes the following steps:

Step 1002: Acquire target user data corresponding to target user identifiers and candidate recommendation object data corresponding to a plurality of candidate recommendation object identifiers respectively, the candidate recommendation object data including data related to the candidate media objects.

The target user identifiers refer to identifiers of target users. The target user identifiers are in one-to-one correspondence with the target user data. The candidate recommendation object identifiers refer to identifiers of candidate recommendation objects. The candidate recommendation object identifiers are in one-to-one correspondence with the candidate recommendation object data.

The target user data refers to data of the target users. The target user data includes user identifiers, user attribute information, multimedia data reviewed by users, multimedia data given a like by users, multimedia data forwarded by users, multimedia data collected by users, etc. The user attribute information may be the age, gender, location, hobbies, interests, etc. of the users, and the multimedia data may be articles, videos, etc.

The candidate recommendation object data refers to data of the candidate recommendation objects. The candidate recommendation objects refer to candidate objects recommended to a target user terminal. The recommendation objects may be articles, videos, files to be downloaded, advertisements, etc. The candidate recommendation object data may be identifiers of the candidate recommendation objects, data of the candidate recommendation objects themselves, interactive data between the candidate recommendation objects and other users, etc. The interactive data between the recommendation objects and other users may be the number of times the candidate recommendation objects are reviewed, the number of times the candidate recommendation objects are downloaded, the number of times the candidate recommendation objects are forwarded, the number of times the candidate recommendation objects are collected, the data that the candidate recommendation objects are given a like, the comment information of other users on the candidate recommendation objects, etc.

The candidate media object data includes data related to the candidate media objects. The candidate media objects refer to candidate media objects which may be recommended to a user terminal. The data related to the candidate media objects may be identifiers of the candidate media objects, data of the candidate media objects themselves, interactive data between the candidate media objects and other users, etc. The interactive data between the candidate media objects and other users may be the number of times the candidate media objects are reviewed, the number of times the candidate media objects are downloaded, the number of times the candidate media objects are forwarded, the number of times the candidate media objects are collected, the data the candidate media object are given a like, the comment information of other users on the candidate media objects, etc.

Step 1004: Respectively generate corresponding model input characteristics of the candidate recommendation object data according to the target user data and the candidate recommendation object data.

In one implementation, the computing device splices the target user data and each candidate recommendation object data to generate the corresponding model input characteristics of each candidate recommendation object data respectively. The splicing method is not limited. For example, the candidate recommendation object data may be spliced following the target user data, and the target user data may be spliced following the candidate recommendation object data.

In another implementation, the computing device maps the target user data and each candidate recommendation object data to generate the corresponding model input characteristics of each candidate recommendation object data respectively.

Step 1006: Respectively input each of the model input characteristics into the last stored recommendation model to obtain a corresponding recommendation probability of each of the model input characteristics.

The computing device inputs each of the model input characteristics into the last stored recommendation model. The corresponding recommendation probability of each of the model input characteristics may be output through the recommendation model. The recommendation probability refers to a probability that the model input characteristics are recommended. The higher the recommendation probability is, the higher the possibility that the model input characteristics are recommended is, and when or in response to determining that the corresponding candidate recommendation objects of the model input characteristics are recommended to the user terminal, the higher the possibility that the user interacts with the recommendation objects is. The user interacts with the recommendation objects in a way of clicking, browsing, downloading, giving a like, forwarding and collecting the recommendation objects.

Step 1008: Sort the candidate media objects corresponding to the candidate recommendation object identifiers according to the corresponding recommendation probability of each of the model input characteristics.

The candidate recommendation objects corresponding to the candidate recommendation object identifiers may be articles, videos, files to be downloaded, advertisements, etc.

The computing device sorts the candidate media objects corresponding to the corresponding candidate recommendation object identifiers of the model input characteristics according to the corresponding recommendation probability of each of the model input characteristics.

In one implementation, the computing device may sort the candidate media objects corresponding to the corresponding candidate recommendation object identifiers of the model input characteristics according to the sequence of the corresponding recommendation probabilities of the model input characteristics from large to small.

In another implementation, the computing device may sort the candidate media objects corresponding to corresponding candidate recommendation object identifiers of the model input characteristics according to the sequence of the corresponding recommendation probabilities of the model input characteristics from small to large.

In one embodiment, the sorting includes recall and fine sorting. The recall refers to coarse sorting with low precision, and the fine sorting refers to sorting with high precision.

Step 1010: Push the sorted candidate media objects to a terminal corresponding to a target user identifier.

In one implementation, the computing device pushes each candidate media object to the terminal corresponding to the target user identifier according to the sorted candidate media objects. For example, the computing device pushes each candidate video to the terminal corresponding to the target user identifier according to each sorted candidate video.

In another implementation, the computing device pushes a specified number of candidate media objects with the highest recommendation probability to the terminal corresponding to the target user identifier according to the sorted candidate media objects. For example, the computing device pushes an APP (Application) to be downloaded with the highest recommendation probability to the terminal corresponding to the target user identifier according to the sorted APP to be downloaded.

In the embodiment, the last stored recommendation model may be adopted to obtain more accurate corresponding recommendation probability of each model input characteristic, thus each candidate media object is sorted more accurately, and the candidate media objects are pushed to the terminal corresponding to the target user identifier more accurately.

In one embodiment, the method described above further includes: acquiring a recommendation result of real-time recommendation by adopting the last stored recommendation model; and evaluating the recommendation model for real-time recommendation according to preset evaluation indexes and based on the recommendation result to obtain an evaluation result.

The evaluation indexes are target parameters for measuring the performance of the recommendation model. The evaluation indexes may include auc, gauc, acc, precision, recall and f1. The auc (area under curve) is used for visually reflecting the classification capability of ROC (receiver operating characteristic) curve expression; the gauc (group auc) is used for evaluating the effect of the personalized evaluation model; acc represents the accuracy rate; prediction represents the precision rate; recall represents the recall rate; and f1 is a comprehensive average of the prediction and the recall, namely a harmonic average.

The computing device recommends the media objects in real time through the last stored recommendation model, acquires the data responding to the media objects, and summarizes the responsive data to generate the recommendation result. The responsive data may be the number of clicks, viewing duration, the number of downloads, the number of like giving times or the number of collections of the media objects, etc.

The computing device evaluates the recommendation model for real-time recommendation according to the preset evaluation indexes and based on the recommendation result to obtain the evaluation result. The evaluation result refers to a result of evaluating the recommendation model for real-time recommendation. The updating effect of the recommendation model may be acquired through the evaluation result. For example, when or in response to determining that the evaluation result of the recommendation model A for real-time recommendation is 95 scores, the recommendation model A has a good real-time recommendation effect, the recommendation model A has a good updating effect, and the model parameters of the recommendation model A are updated. In another example, when or in response to determining that the evaluation result of the recommendation model B for real-time recommendation is 60 scores, the recommendation model B has a general real-time recommendation effect, the recommendation model has a general updating effect, and the model parameters of the recommendation model B are updated with low accuracy.

In the embodiment, a recommendation result of real-time recommendation by adopting the last stored recommendation model is acquired. The recommendation model for real-time recommendation is evaluated according to the preset evaluation indexes and based on the recommendation result to obtain the evaluation result, thus the effect of real-time recommendation of the recommendation model can be evaluated, and the recommendation model can be improved subsequently.

Figure 11:
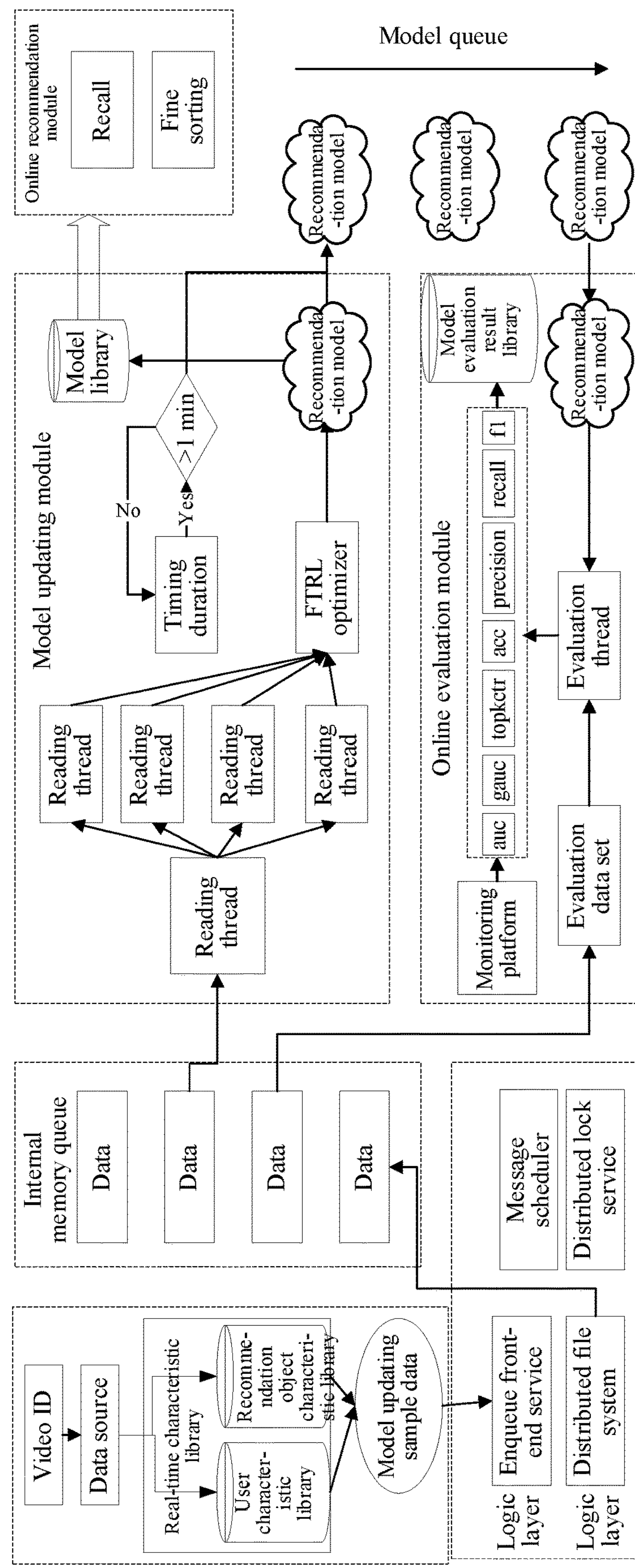
FIG. 11 is a schematic framework diagram of online streaming learning according to certain embodiment(s) of the present disclosure.

FIG. 11 is a framework diagram of online streaming learning in one embodiment. The online streaming learning framework includes a data preparation module, a model updating module, an online evaluation module and an online recommendation module. The data preparation module is responsible for data provision of the model updating module and the online evaluation module. Firstly, the computing device collects data of like giving, forwarding and collecting of a user in a video ID in real time, and takes the data as a data source. The data source includes the sample user data and the sample recommendation object data. The computing device stores the sample user data in the user characteristic library in real time through key–value operation, and stores the sample recommendation object data in the recommendation object characteristic library in real time through the key–value operation. A real-time characteristic library includes the user characteristic library and the recommendation object characteristic library.

The computing device collects, in real time, the sample user data corresponding to a plurality of sample user identifiers respectively and the sample recommendation object data corresponding to a plurality of sample recommendation object identifiers respectively from the user characteristic library, and generates the model updating sample characteristics according to the sample user data and the sample recommendation object data. The computing device writes the model updating sample data into a message queue. In certain embodiment(s), the computing device writes the model updating sample data into an enqueue front-end service of a logic layer first, and writes the model updating sample data into a distributed file system of a data layer from the enqueue front-end service of the logic layer.

The computing device acquires the model updating sample characteristics from the message queue and press the model updating sample characteristics into an internal memory queue. The model updating sample characteristics in the internal memory queue may be provided for the model updating module and the online evaluation module.

The model updating module is a training module supporting a plurality of threads. The model updating sample characteristics are read from the internal memory queue through the reading thread (TrainReader thread) and distributed to the plurality of training threads. Model parameters updated in different training threads at a same moment are different. The updated recommendation model is obtained according to the model parameters updated in each training thread. The recommendation model is adjusted by an FTRL adjuster. The model parameters in the recommendation model are subjected to sparsification treatment. Thus the complexity of the recommendation model may be reduced, and the consumption of the internal memory space of the recommendation model is decreased.

The computing device monitors the timing duration of updating the recommendation model in real time, and outputs the updated recommendation model if the timing duration is more than 1 min. During outputting of the updated recommendation model, the updated recommendation model may be stored in a model library, and the updated recommendation model is imported into a model queue.

The online recommendation module may acquire the last stored recommendation model from the model library, and input the corresponding model input characteristic of each of the obtained candidate recommendation object data into the last stored recommendation model to obtain a corresponding recommendation probability of each of the model input characteristics. The candidate recommendation object data includes data related to the candidate media objects. The candidate recommendation objects corresponding to the candidate recommendation object identifiers are recalled and finely sorted according to the corresponding recommendation probability of each of the model input characteristics. The sorted candidate recommendation objects are pushed to a terminal corresponding to a target user identifier.

The online evaluation module monitors whether there is a recommendation model to be evaluated in the model queue, if so, pops up the recommendation model to be evaluated from the model queue, and acquires an evaluation data set from the internal memory queue in real time. The evaluation data set is the responsive data obtained after the recommendation model to be evaluated performs real-time recommendation, and the recommendation result can be obtained through the evaluation data set. The recommendation model for real-time recommendation is evaluated according to preset evaluation indexes and based on the recommendation result to obtain an evaluation result. The evaluation indicators include auc, gauc, topkctr, acc, precision, recall and f1.

The evaluation result of the recommendation model is fed back to a monitoring platform in real time and written into a model evaluation result library of the distributed file system in real time.

It is to be understood that although the steps in the flowcharts of FIG. 2 to FIG. 4, FIG. 6, FIG. 7, FIG. 9, and FIG. 10 are sequentially displayed in accordance with instructions of arrows, these steps are not necessarily performed sequentially in the order indicated by the arrows. Unless otherwise clearly specified in the present disclosure, the steps are performed without any strict sequence limit, and may be performed in other sequences. Moreover, at least some of the steps of FIG. 2 to FIG. 4, FIG. 6, FIG. 7, FIG. 9, and FIG. 10 may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of another step.

Figure 12:
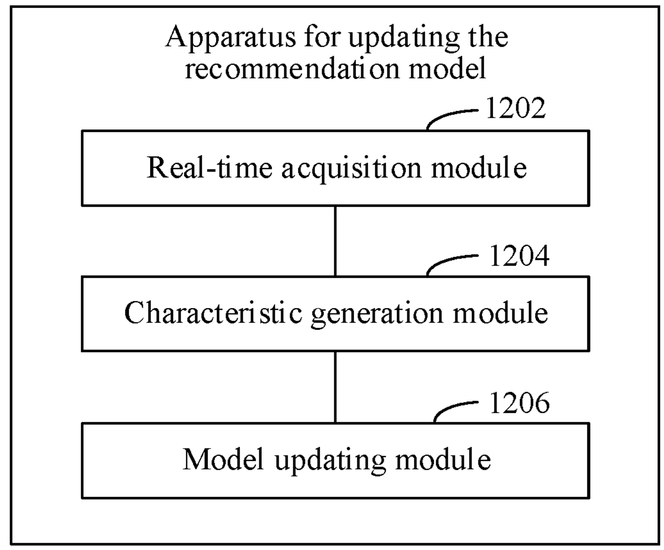
FIG. 12 is a schematic structural block diagram of an apparatus for updating the recommendation model according to certain embodiment(s) of the present disclosure.

In one embodiment, as shown in FIG. 12, an apparatus for updating the recommendation model is provided. The apparatus may adopt a software module or a hardware module, or a combination of the software module and the hardware module to form a part of the computing device. The apparatus includes: a real-time acquisition module 1202, a characteristic generation module 1204 and a model updating module 1206.

The real-time acquisition module 1202 is configured to acquire sample user data and sample recommendation object data in real time, the sample recommendation object data including data related to sample media objects.

The characteristic generation module 1204 is configured to generate the model updating sample characteristics according to the sample user data and the sample recommendation object data, the model updating sample characteristics including sub-characteristics of at least two characteristic dimensions.

The model updating module 1206 is configured to input the model updating sample characteristics into the recommendation model to update the recommendation model in real time, the recommendation model updated in real time performing recommendation on media objects in real time, and performing local sparsification on model parameters meeting a model sparsification condition when or in response to determining that the corresponding model parameters of the sub-characteristics in the model updating sample characteristics meet the model sparsification condition in the process of updating the recommendation model in real time.

According to the apparatus for updating the recommendation model described above, on one hand, by acquiring the sample user data and the sample recommendation object data in real time to generate the model updating sample characteristics, online data changes can be captured in time; by inputting the model updating sample characteristics into the recommendation model to update the recommendation model in real time, the recommendation model can be updated online, and the timeliness of the recommendation model can be effectively guaranteed; and therefore, when the recommendation model updated in real time is used for recommending the media objects in real time, the timeliness of the recommended media objects can be effectively guaranteed. On the other hand, since the model updating samples include the sub-characteristics of at least two characteristic dimensions, the operation of performing local sparsification on the model parameters meeting the model sparsification condition when or in response to determining that corresponding model parameters of the sub-characteristics in the model updating sample characteristics meet the model sparsification condition in the process of updating the recommendation model in real time is realized. Thus the model parameters can be subjected to sparsification treatment in the process of updating the recommendation model in real time. The complexity of the model parameters in the recommendation model is reduced. The quick expansion of the model parameters of the recommendation model under long running is avoided. As a result, the consumption of the internal memory space of the recommendation model can be reduced.

In one embodiment, the real-time acquisition module 1202 described above is also configured to collect, in real time, sample user data corresponding to a plurality of sample user identifiers respectively and sample recommendation object data corresponding to a plurality of sample recommendation object identifiers respectively; correspondingly store each of the sample user data and the corresponding sample user identifier into a user characteristic library, and store each of the sample recommendation object data and the corresponding sample recommendation object identifier into a recommendation object characteristic library, a real-time characteristic library including the user characteristic library and the recommendation object characteristic library; and acquire the sample user data and the sample recommendation object data from the real-time characteristic library in real time.

In one embodiment, the sample user data includes a candidate sub-characteristic of at least one characteristic dimension. The sample recommendation object data includes a candidate sub-characteristic of at least one characteristic dimension. The model updating sample characteristics include target sub-characteristics of at least two characteristic dimensions. The characteristic generation module 1204 described above is further configured to respectively acquire a corresponding sampling probability of each of the candidate sub-characteristics, a parameter value of the sampling probability representing a probability that the corresponding candidate sub-characteristic is adopted during updating of the recommendation model; filter out corresponding candidate sub-characteristics of the sampling probabilities with the parameter values smaller than a probability threshold value; and generate model updating sample characteristics according to the sample user data and the sample recommendation object data after the candidate sub-characteristics are filtered out.

In one embodiment, the sample user data and sample recommendation object data are acquired from the real-time characteristic library. The characteristic generation module 1204 described above is further configured to respectively acquire a corresponding occurrence frequency of each of the candidate sub-characteristics in the real-time characteristic library; and calculate to obtain a corresponding sampling probability of each of the candidate sub-characteristics according to the preset probability and the corresponding occurrence frequency of each of the candidate sub-characteristics.

In one embodiment, the model updating module 1206 described above is further configured to distribute the model updating sample characteristics to the at least two training threads, the at least two training threads sharing the recommendation model; locally update the model parameters of the recommendation model in each training thread according to the received model updating sample characteristic, different training threads updating different model parameters at a same moment; and obtain the updated recommendation model according to the model parameters updated in each training thread.

In one embodiment, the apparatus for updating the recommendation model described above further includes a reading module configured to write the model updating sample characteristics into a queue; and read the model updating sample characteristics from the queue in a streaming mode through a reading thread. The model updating module 1206 described above is further configured to distribute the read model updating sample characteristics to the at least two training threads through the reading thread.

In one embodiment, the model updating module 1206 described above is further configured to perform local sparsification on model parameters meeting the model sparsification condition when or in response to determining that the values of the corresponding model parameters of the sub-characteristics in the model updating sample characteristics meet the model sparsification condition.

In one embodiment, the corresponding model parameters of the sub-characteristics include the weight parameters and the implicit vector parameters. The model updating module 1206 described above is further configured to judge that the values of the corresponding model parameters of the sub-characteristics meet the model sparsification condition when or in response to determining that the values of the corresponding weight parameters of the sub-characteristics in the model updating sample characteristics approach or reach a lower limit of weight; and update the values of the corresponding implicit vector parameters of the sub-characteristics to be consistent with the values of the corresponding weight parameters of the sub-characteristics.

In one embodiment, the model updating module 1206 described above is further configured to perform local sparsification on the model parameters meeting the model sparsification condition when or in response to determining that the updating time of the corresponding model parameters of the sub-characteristics in the model updating sample characteristics meets the model sparsification condition.

In one embodiment, the model updating module 1206 described above is further configured to acquire a last updating moment of the corresponding model parameters of the sub-characteristics in the model updating sample characteristics; judge that the updating time of the corresponding model parameters of the sub-characteristics meets the model sparsification condition when or in response to determining that a time interval between the last updating moment and a current moment is greater than a preset interval; and delete the corresponding model parameters of the sub-characteristics.

In one embodiment, a plurality of model updating sample characteristics are provided. The model updating module 1206 described above is further configured to determine the corresponding sub-characteristics with the model parameters deleted as elimination objects; and delete the elimination objects from the model updating sample characteristics without being input into the recommendation model.

In one embodiment, the apparatus for updating the recommendation model described above further includes a recommendation module. The recommendation module is configured to store the recommendation model updated at a current moment when or in response to determining that a timing duration for updating the recommendation model in real time reaches a preset duration, reset the timing duration, and update the recommendation model in real time; and recommend the media objects in real time through the last stored recommendation model.

In one embodiment, the online recommendation module described above is further configured to acquire target user data corresponding to target user identifiers and candidate recommendation object data corresponding to a plurality of candidate recommendation object identifiers respectively, the candidate recommendation object data including data related to the candidate media objects; respectively generate corresponding model input characteristic of each of the candidate recommendation object data according to the target user data and each of the candidate recommendation object data; respectively input each of the model input characteristic into the last stored recommendation model to obtain a corresponding recommendation probability of each of the model input characteristics; sort the candidate media objects corresponding to the candidate recommendation object identifiers according to the corresponding recommendation probability of each of the model input characteristics; and push the sorted candidate media objects to a terminal corresponding to a target user identifier.

In one embodiment, the apparatus for updating the recommendation model described above further includes the online evaluation module, where the online evaluation module is configured to acquire a recommendation result of real-time recommendation by using the last stored recommendation model; and evaluate the recommendation model for real-time recommendation according to preset evaluation indexes and based on the recommendation result to obtain an evaluation result.

For a limitation on the apparatus for updating the recommendation model, reference may be made to the limitation on the method for updating the recommendation model. Details are not described herein again. The modules in the apparatus for updating a recommendation model may be implemented entirely or partially by software, hardware, or a combination thereof. The modules may be built in or independent of a processor of a computing device in a hardware form, or may be stored in a memory of the computing device in a software form, so that the processor invokes and performs an operation corresponding to each of the modules.

In an embodiment, a computing device is provided. The computing device may be a server, and an internal structure diagram thereof may be shown in FIG. 13. The computing device includes a processor, a memory, and a network interface that are connected by using a system bus. The processor of the terminal is configured to provide computing and control capabilities. The memory of the computing device includes a non-volatile storage medium and an internal memory. The non-volatile storage medium stores an operating system, a computer program, and a database. The internal memory provides an environment for running of the operating system and the computer program in the non-volatile storage medium. The database of the computing device is used for storing data such as the model parameters, the sample user data, the sample recommendation data, the model updating sample characteristics, the sample user identifiers, and the sample recommendation object identifiers. The network interface of the computing device is configured to communicate with an external terminal through a network connection. The computer program is executed by the processor to implement a method for updating a recommendation model.

Figure 13:
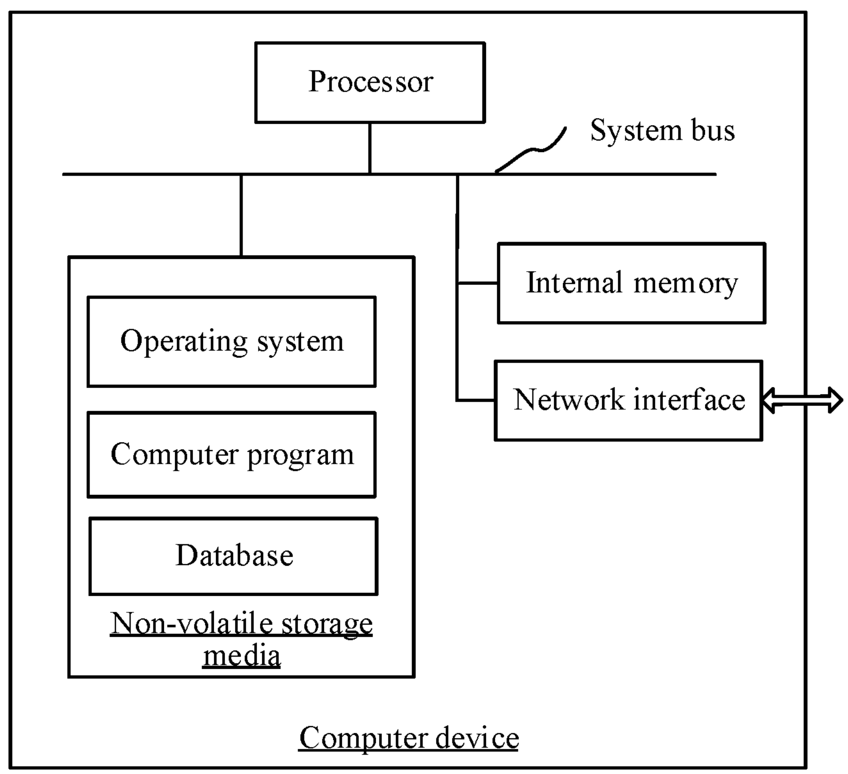
FIG. 13 is a schematic diagram of an internal structure of a computing device according to certain embodiment(s) of the present disclosure.

A person skilled in the art may understand that, the structure shown in FIG. 13 is only a block diagram of a part of a structure related to a solution of the present disclosure and does not limit the computing device to which the solution of the present disclosure is applied. In certain embodiment(s), the computing device may include more or fewer components than those in the drawings, or some components are combined, or a different component deployment is used.

In an embodiment, a computing device is further provided, including: a memory and one or more processors, the memory storing computer-readable instructions, the computer-readable instructions, when executed by the one or more processors, causing the one or more processors to perform the steps in the method embodiments.

In an embodiment, one or more non-volatile storage media storing computer-readable instructions are provided, the computer-readable instructions, when executed by one or more processors, causing the one or more processors to perform the steps in the method embodiments.

In an embodiment, a computer program product or a computer program is provided. The computer program product or the computer program includes computer instructions, and the computer instructions are stored in a computer-readable storage medium. A processor of a computing device reads the computer instructions from the computer-readable storage medium, and the processor executes the computer instructions, to cause the computing device to perform the steps in the method embodiments.

A person of ordinary skill in the art may understand that all or some of procedures of the method in the embodiments may be implemented by a computer program instructing relevant hardware. The computer program may be stored in a non-volatile computer-readable storage medium. When the computer program is executed, the procedures of the method embodiments may be implemented. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The technical features in the embodiments may be randomly combined. For concise description, not all possible combinations of the technical features in the embodiment are described. However, provided that combinations of the technical features do not conflict with each other, the combinations of the technical features are considered as falling within the scope recorded in the present disclosure.

The embodiments only describe several implementations of the present disclosure, and their description is detailed, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure is subject to the protection scope of the appended claims.

What is claimed is:

1. A method for updating a recommendation model, performed by a computing device, the method comprising:

acquiring, by the computing device, sample user data from a user characteristic library stored on a server and sample recommendation object data from a recommendation object characteristic library stored on the server, the sample recommendation object data including data related to sample media objects;

generating model updating sample characteristics according to the sample user data and the sample recommendation object data, the model updating sample characteristics comprising sub-characteristics of at least two characteristic dimensions;

inputting the model updating sample characteristics into the recommendation model to update the recommendation model in real time, wherein the updated recommendation model is configured for performing recommendation on media objects; and performing local sparsification on model parameters meeting a model sparsification condition in response to determining that the corresponding model parameters of the sub-characteristics in the model updating sample characteristics meet the model sparsification condition in the process of updating the recommendation model, wherein inputting the model updating sample characteristics to update the recommendation model comprises:

writing the model updating sample characteristics into a message queue, the message queue being of a linear storage structure in a memory of the server;

acquiring, from the message queue, the model updating sample characteristics in real time and writing the model updating sample characteristics into an internal memory queue on the server;

reading the model updating sample characteristics from the internal memory queue in a streaming mode through a reading thread;

distributing the model updating sample characteristics read by the reading thread from the internal memory queue to at least two training threads, the at least two training threads sharing the recommendation model, each training thread being an operation program executed by the processor of the computing device and being configured to perform operation scheduling;

locally updating the model parameters of the recommendation model in each of the training threads according to the received model updating sample characteristics, and setting a lock function for each model parameter to control model parameters updated in different training threads at the same moment to be different;

acquiring the updated recommendation model according to the updated model parameters of each of the training threads; and monitoring, by the computing device, a time duration of updating the recommendation model, and in response to the time duration being greater than a duration threshold, storing the updated recommendation model in a model library on the server, and importing the updated recommendation model into a model queue, wherein the method further comprises: recommending, by the computing device, the media objects through the recommendation model, including:

inputting model input characteristics related to candidate media objects and target user data into the recommendation model stored in the model library on the server, to obtain corresponding recommendation probabilities of the model input characteristics;

sorting the candidate media objects corresponding to the candidate recommendation object identifiers according to the corresponding recommendation probabilities of the model input characteristics; and pushing the sorted candidate media objects to a user terminal corresponding to a target user identifier.

2. The method according to claim 1, wherein acquiring the sample user data and sample recommendation object data comprises:

collecting sample user data corresponding to a plurality of sample user identifiers and sample recommendation object data corresponding to a plurality of sample recommendation object identifiers;

correspondingly storing each of the sample user data and the corresponding sample user identifier into a user characteristic library, and storing each of the sample recommendation object data and the corresponding sample recommendation object identifier into a recommendation object characteristic library, a characteristic library comprising the user characteristic library and the recommendation object characteristic library; and acquiring the sample user data and the sample recommendation object data from the characteristic library.

3. The method according to claim 1, wherein the sample user data includes a candidate sub-characteristic of at least one characteristic dimension; the sample recommendation object data includes a candidate sub-characteristic of at least one characteristic dimension; the model updating sample characteristics include target sub-characteristics of at least two characteristic dimensions; and generating the model updating sample characteristics comprises:

acquiring a corresponding sampling probability of each of the candidate sub-characteristics, a parameter value of the sampling probability representing a probability that the corresponding candidate sub-characteristic is adopted during updating of the recommendation model;

filtering out corresponding candidate sub-characteristics of the sampling probabilities with the parameter values smaller than a probability threshold value; and generating the model updating sample characteristics according to the sample user data and the sample recommendation object data after the candidate sub-characteristics are filtered out.

4. The method according to claim 3, wherein the sample user data and the sample recommendation object data are acquired from a characteristic library; and acquiring corresponding sampling probabilities of the candidate sub-characteristics comprises:

acquiring a corresponding occurrence frequency of each of the candidate sub-characteristics in the characteristic library; and calculating to obtain the corresponding sampling probability of each of the candidate sub-characteristics according to a preset probability and the corresponding occurrence frequency of each of the candidate sub-characteristics.

5. The method according to claim 1, wherein performing the local sparsification comprises:

performing local sparsification on model parameters meeting a model sparsification condition in response to determining that values of the corresponding model parameters of the sub-characteristics in the model updating sample characteristics meet the model sparsification condition.

6. The method according to claim 5, wherein the corresponding model parameters of the sub-characteristics include weight parameters and implicit vector parameters;

performing the local sparsification comprises:

judging that the values of the corresponding model parameters of the sub-characteristics meet the model sparsification condition in response to determining that the values of the corresponding weight parameters of the sub-characteristics in the model updating sample characteristics approach or reach a lower limit of weight; and updating the values of the corresponding implicit vector parameters of the sub-characteristics to be consistent with the values of the corresponding weight parameters of the sub-characteristics.

7. The method according to claim 1, wherein performing the local sparsification comprises:

performing local sparsification on model parameters meeting a model sparsification condition in response to determining that the updating time of the corresponding model parameters of the sub-characteristics in the model updating sample characteristics meets the model sparsification condition.

8. The method according to claim 7, wherein performing the local sparsification comprises:

acquiring a last updating moment of the corresponding model parameters of the sub-characteristics in the model updating sample characteristics;

judging that the updating time of the corresponding model parameters of the sub-characteristics meets the model sparsification condition in response to determining that a time interval between the last updating moment and a current moment is greater than a preset interval; and deleting the corresponding model parameters of the sub-characteristics.

9. The method according to claim 8, wherein a plurality of model updating sample characteristics are provided, and the method further comprises:

determining the corresponding sub-characteristics with model parameters deleted as elimination objects; and deleting the elimination objects from the model updating sample characteristics without being input into the recommendation model.

10. The method according to claim 1, further comprising:

storing the recommendation model updated at a current moment in response to determining that a timing duration for updating the recommendation model in real time reaches a preset duration, resetting the timing duration, and updating the recommendation model; and recommending the media objects through the last stored recommendation model.

11. The method according to claim 10, wherein recommending the media objects comprises:

acquiring target user data corresponding to target user identifiers and candidate recommendation object data corresponding to a plurality of candidate recommendation object identifiers, the candidate recommendation object data including data related to candidate media objects;

generating corresponding model input characteristics of the candidate recommendation object data according to the target user data and the candidate recommendation object data;

inputting each of the model input characteristics into the last stored recommendation model to obtain a corresponding recommendation probability of each of the model input characteristics;

sorting the candidate media objects corresponding to the candidate recommendation object identifiers according to the corresponding recommendation probability of each of the model input characteristics; and pushing the sorted candidate media objects to a terminal corresponding to a target user identifier.

12. The method according to claim 10, further comprising:

acquiring a recommendation result of real-time recommendation by adopting the last stored recommendation model; and evaluating the recommendation model according to preset evaluation indexes and based on the recommendation result to obtain an evaluation result.

13. The method according to claim 1, wherein when the lock function is set for a first model parameter, at the same moment, a first model parameter is solely updated in a first training thread and not updated by another training thread.

14. The method according to claim 1, wherein the model parameters being updated include at least one of: a number of convolution kernels of the recommendation model, parameters in a convolution layer of the recommendation model, a number of pooling layers of the recommendation model, weight parameters of the sub-characteristics, and implicit vector parameters of the sub-characteristics.

15. An apparatus for updating a recommendation model, the apparatus comprising: a memory storing computer program instructions; and a processor coupled to the memory and configured to execute the computer program instructions and perform:

sample user data from a user characteristic library stored on a server and sample recommendation object data from a recommendation object characteristic library stored on the server, the sample recommendation object data including data related to sample media objects;

generating model updating sample characteristics according to the sample user data and the sample recommendation object data, the model updating sample characteristics comprising sub-characteristics of at least two characteristic dimensions;

inputting the model updating sample characteristics into the recommendation model to update the recommendation model in real time, wherein the updated recommendation model is configured for performing recommendation on media objects; and performing local sparsification on model parameters meeting a model sparsification condition in response to determining that the corresponding model parameters of the sub-characteristics in the model updating sample characteristics meet the model sparsification condition in the process of updating the recommendation model, wherein inputting the model updating sample characteristics to update the recommendation model comprises:

writing the model updating sample characteristics into a message queue, the message queue being of a linear storage structure in a memory of the server;

acquiring, from the message queue, the model updating sample characteristics in real time and writing the model updating sample characteristics into an internal memory queue on the server;

reading the model updating sample characteristics from the internal memory queue in a streaming mode through a reading thread;

distributing the model updating sample characteristics read by the reading thread from the internal memory queue to at least two training threads, the at least two training threads sharing the recommendation model, each training thread being an operation program executed by the processor and being configured to perform operation scheduling;

locally updating the model parameters of the recommendation model in each of the training threads according to the received model updating sample characteristics, and setting a lock function for each model parameter to control model parameters updated in different training threads at the same moment to be different;

acquiring the updated recommendation model according to the updated model parameters of each of the training threads; and monitoring a time duration of updating the recommendation model, and in response to the time duration being greater than a duration threshold, storing the updated recommendation model in a model library on the server, and importing the updated recommendation model into a model queue, wherein the processor is further configured to recommend the media objects through the recommendation model, including:

inputting model input characteristics related to candidate media objects and target user data into the recommendation model stored in the model library on the server, to obtain corresponding recommendation probabilities of the model input characteristics;

sorting the candidate media objects corresponding to the candidate recommendation object identifiers according to the corresponding recommendation probabilities of the model input characteristics; and pushing the sorted candidate media objects to a user terminal corresponding to a target user identifier.

16. The apparatus according to claim 15, wherein acquiring the sample user data and sample recommendation object data includes:

collecting sample user data corresponding to a plurality of sample user identifiers and sample recommendation object data corresponding to a plurality of sample recommendation object identifiers;

correspondingly storing each of the sample user data and the corresponding sample user identifier into a user characteristic library, and storing each of the sample recommendation object data and the corresponding sample recommendation object identifier into a recommendation object characteristic library, a characteristic library comprising the user characteristic library and the recommendation object characteristic library; and acquiring the sample user data and the sample recommendation object data from the characteristic library.

17. The apparatus according to claim 15, wherein the sample user data includes a candidate sub-characteristic of at least one characteristic dimension; the sample recommendation object data includes a candidate sub-characteristic of at least one characteristic dimension; the model updating sample characteristics include target sub-characteristics of at least two characteristic dimensions; and generating the model updating sample characteristics includes:

acquiring a corresponding sampling probability of each of the candidate sub-characteristics, a parameter value of the sampling probability representing a probability that the corresponding candidate sub-characteristic is adopted during updating of the recommendation model;

filtering out corresponding candidate sub-characteristics of the sampling probabilities with the parameter values smaller than a probability threshold value; and generating the model updating sample characteristics according to the sample user data and the sample recommendation object data after the candidate sub-characteristics are filtered out.

18. The apparatus according to claim 17, wherein the sample user data and the sample recommendation object data are acquired from a characteristic library; and acquiring corresponding sampling probabilities of the candidate sub-characteristics includes:

acquiring a corresponding occurrence frequency of each of the candidate sub-characteristics in the characteristic library; and calculating to obtain the corresponding sampling probability of each of the candidate sub-characteristics according to a preset probability and the corresponding occurrence frequency of each of the candidate sub-characteristics.

19. A non-transitory computer-readable storage medium storing computer program instructions executable by at least one processor to perform:

acquiring sample user data from a user characteristic library stored on a server and sample recommendation object data from a recommendation object characteristic library stored on the server, the sample recommendation object data including data related to sample media objects;

generating model updating sample characteristics according to the sample user data and the sample recommendation object data, the model updating sample characteristics comprising sub-characteristics of at least two characteristic dimensions;

inputting the model updating sample characteristics into the recommendation model to update the recommendation model in real time, wherein the updated recommendation model is configured for performing recommendation on media objects; and performing local sparsification on model parameters meeting a model sparsification condition in response to determining that the corresponding model parameters of the sub- characteristics in the model updating sample characteristics meet the model sparsification condition in the process of updating the recommendation model, wherein inputting the model updating sample characteristics to update the recommendation model comprises:

writing the model updating sample characteristics into a message queue, the message queue being of a linear storage structure in a memory of the server;

acquiring, from the message queue, the model updating sample characteristics in real time and writing the model updating sample characteristics into an internal memory queue on the server;

reading the model updating sample characteristics from the internal memory queue in a streaming mode through a reading thread;

distributing the model updating sample characteristics read by the reading thread from the internal memory queue to at least two training threads, the at least two training threads sharing the recommendation model, each training thread being an operation program executed by the processor and being configured to perform operation scheduling;

locally updating the model parameters of the recommendation model in each of the training threads according to the received model updating sample characteristics, and setting a lock function for each model parameter to control model parameters updated in different training threads at the same moment to be different;

acquiring the updated recommendation model according to the updated model parameters of each of the training threads; and monitoring a time duration of updating the recommendation model, and in response to the time duration being greater than a duration threshold, storing the updated recommendation model in a model library on the server, and importing the updated recommendation model into a model queue, wherein the computer program further cause the processor to perform: recommending the media objects through the recommendation model, including:

inputting model input characteristics related to candidate media objects and target user data into the recommendation model stored in the model library on the server, to obtain corresponding recommendation probabilities of the model input characteristics;

sorting the candidate media objects corresponding to the candidate recommendation object identifiers according to the corresponding recommendation probabilities of the model input characteristics; and pushing the sorted candidate media objects to a user terminal corresponding to a target user identifier.

* * * * *